United States Patent
Liu et al.

(10) Patent No.: US 12,088,937 B2
(45) Date of Patent: Sep. 10, 2024

(54) BITLINE SETTLING AND POWER SUPPLY REJECTION RATIO IN A NINE CELL PIXEL IMAGE SENSOR WITH PHASE DETECTION AUTOFOCUS

(71) Applicant: OMNIVISION TECHNOLOGIES, INC., Santa Clara, CA (US)

(72) Inventors: Xuelian Liu, Sunnyvale, CA (US); Min Qu, Mountain View, CA (US); Liang Zuo, Milpitas, CA (US); Selcuk Sen, Mountain View, CA (US); Hiroaki Ebihara, San Jose, CA (US); Rui Wang, San Jose, CA (US); Lihang Fan, Sunnyvale, CA (US)

(73) Assignee: OmniVision Technologies, Inc., Santa Clara, CA (US)

( * ) Notice: Subject to any disclaimer, the term of this patent is extended or adjusted under 35 U.S.C. 154(b) by 188 days.

(21) Appl. No.: 17/658,559

(22) Filed: Apr. 8, 2022

(65) Prior Publication Data
US 2023/0328405 A1    Oct. 12, 2023

(51) Int. Cl.
*H04N 25/709* (2023.01)
*H04N 25/78* (2023.01)
*H04N 25/704* (2023.01)
*H04N 25/75* (2023.01)

(52) U.S. Cl.
CPC ......... *H04N 25/709* (2023.01); *H04N 25/78* (2023.01); *H04N 25/704* (2023.01); *H04N 25/75* (2023.01)

(58) Field of Classification Search
CPC .... H04N 25/704; H04N 25/709; H04N 25/75; H04N 25/778; H04N 25/78
See application file for complete search history.

(56) References Cited

U.S. PATENT DOCUMENTS

| 10,165,210 | B1 * | 12/2018 | Wang ................. H04N 25/616 |
| 11,683,602 | B1 * | 6/2023 | Lee ...................... H04N 25/447 348/222.1 |
| 2019/0205886 | A1 | 7/2019 | Ramakrishnan et al. |
| 2020/0036917 | A1 | 1/2020 | Komai |
| 2022/0328548 | A1 | 10/2022 | Lee et al. |
| 2022/0367540 | A1 | 11/2022 | Saka et al. |

* cited by examiner

*Primary Examiner* — Antoinette T Spinks
(74) *Attorney, Agent, or Firm* — Perkins Coie LLP

(57) ABSTRACT

An imaging device includes a pixel array of pixel circuits arranged in rows and columns. Bitlines are coupled to the pixel circuits. Clamp circuits are coupled to the bitlines. Each of the clamp circuits includes a clamp short transistor to a power line and a respective one of the bitlines. The clamp short transistor is configured to be switched in response to a clamp short enable signal. A first diode drop device is coupled to the power line. A clamp idle transistor is coupled to the first diode drop device such that the first diode drop device and the clamp idle transistor are coupled between the power line and the respective one of the bitlines. The clamp idle transistor is configured to be switched in response to a clamp idle enable signal.

21 Claims, 14 Drawing Sheets

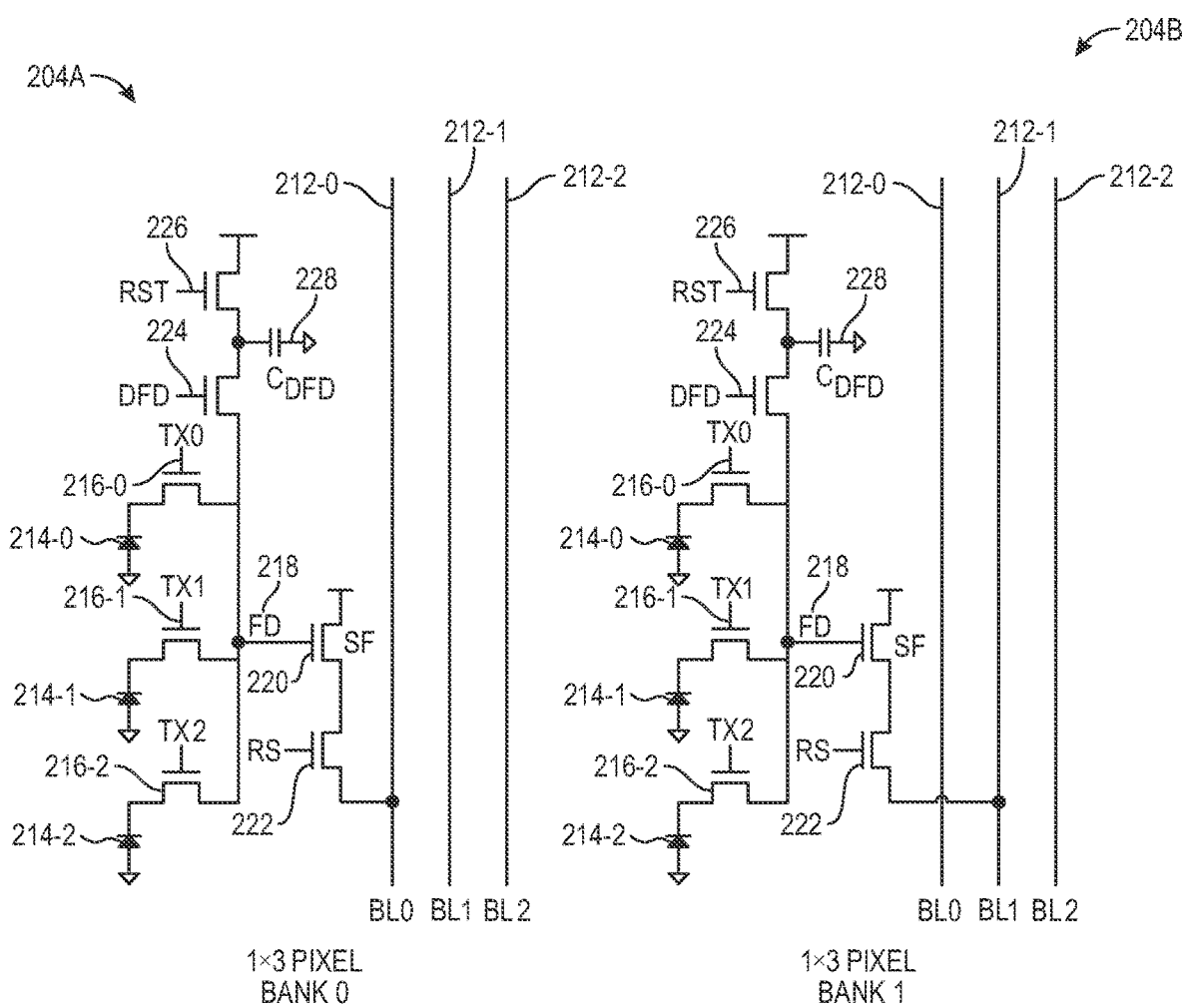
*FIG. 2A*  *FIG. 2B*

BITLINE SETTLING AND POWER SUPPLY REJECTION RATIO IN A NINE CELL PIXEL IMAGE SENSOR WITH PHASE DETECTION AUTOFOCUS

BACKGROUND INFORMATION

Field of the Disclosure

This disclosure relates generally to image sensors, and in particular but not exclusively, relates to improved bitline settling and power supply rejection ratio in image sensors that include binned pixels with phase detection autofocus.

Background

Image sensors have become ubiquitous and are now widely used in digital cameras, cellular phones, security cameras as well as in medical, automotive, and other applications. As image sensors are integrated into a broader range of electronic devices, it is desirable to enhance their functionality, performance metrics, and the like in as many ways as possible (e.g., resolution, power consumption, dynamic range, etc.) through both device architecture design as well as image acquisition processing. The technology used to manufacture image sensors has continued to advance at a great pace. For example, the demands of higher resolution and lower power consumption have encouraged the further miniaturization and integration of these devices.

A typical complementary metal oxide semiconductor (CMOS) image sensor operates in response to image light from an external scene being incident upon the image sensor. The image sensor includes an array of pixels having photosensitive elements (e.g., photodiodes) that absorb a portion of the incident image light and generate image charge upon absorption of the image light. The image charge photogenerated by the pixels may be measured as analog output image signals on column bitlines that vary as a function of the incident image light. In other words, the amount of image charge generated is proportional to the intensity of the image light, which are read out as analog signals from the column bitlines and converted to digital values to produce digital images (i.e., image data) that represent the external scene.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

FIG. 2A illustrates a one example of a schematic of a 1×3 pixel circuit coupled to a first bitline of a grouping of 3 bitlines per column of a pixel array in accordance with the teachings of the present disclosure.

FIG. 2B illustrates a one example of a schematic of a 1×3 pixel circuit coupled to a second bitline of a grouping of 3 bitlines per column of a pixel array in accordance with the teachings of the present disclosure.

Figure 1:
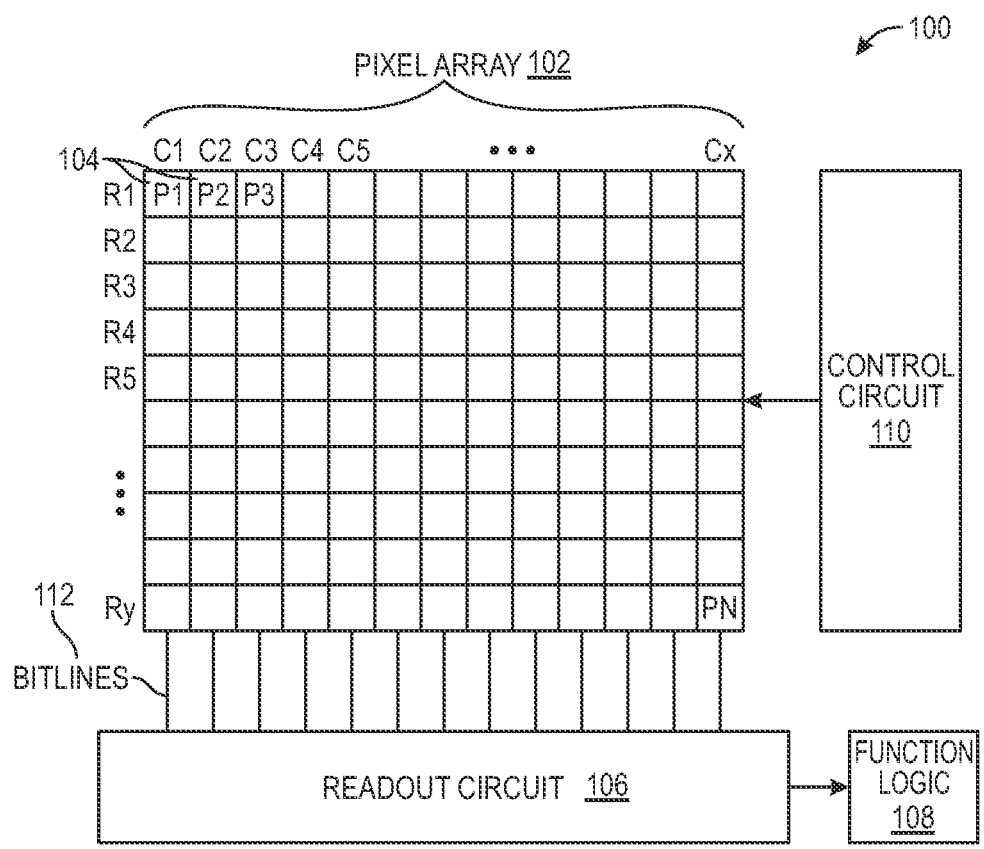
FIG. 1 illustrates one example of an imaging system including a pixel array in accordance with the teachings of the present invention.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. In addition, common but well-understood elements that are useful or necessary in a commercially feasible embodiment are often not depicted in order to facilitate a less obstructed view of these various embodiments of the present invention.

DETAILED DESCRIPTION

Examples directed to an imaging systems with 9 cell pixel image sensors including phase detection autofocus pixels with improved bitline settling and power supply rejection ratio are described herein. In the following description, numerous specific details are set forth to provide a thorough understanding of the examples. One skilled in the relevant art will recognize, however, that the techniques described herein can be practiced without one or more of the specific details, or with other methods, components, materials, etc. In other instances, well-known structures, materials, or operations are not shown or described in detail in order to avoid obscuring certain aspects.

Reference throughout this specification to "one example" or "one embodiment" means that a particular feature, structure, or characteristic described in connection with the example is included in at least one example of the present invention. Thus, the appearances of the phrases "in one example" or "in one embodiment" in various places throughout this specification are not necessarily all referring to the same example. Furthermore, the particular features, structures, or characteristics may be combined in any suitable manner in one or more examples.

Spatially relative terms, such as "beneath," "below," "over," "under," "above," "upper," "top," "bottom," "left," "right," "center," "middle," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is rotated or turned over, elements described as "below" or "beneath" or "under" other elements or features would then be oriented "above" the other elements or features. Thus, the exemplary terms "below" and "under" can encompass both an orientation of above and below. The device may be otherwise oriented (rotated ninety degrees or at other orientations) and the spatially relative descriptors used herein interpreted accordingly. In addition, it will also be understood that when an element is referred to as being "between" two other elements, it can be the only element between the two other elements, or one or more intervening elements may also be present.

Throughout this specification, several terms of art are used. These terms are to take on their ordinary meaning in the art from which they come, unless specifically defined herein or the context of their use would clearly suggest otherwise. It should be noted that element names and symbols may be used interchangeably through this document (e.g., Si vs. silicon); however, both have identical meaning.

As will be discussed, various examples of an imaging system include a pixel array with a plurality of 1×3 pixel circuits arranged in rows and columns of the pixel array. Each 1×3 pixel circuit includes 3 photodiodes that are arranged along a respective column. A plurality of bitlines is coupled to the plurality of 1×3 pixel circuits. The plurality of bitlines is divided in groupings of 3 bitlines per column of 1×3 pixel circuits. Each column of the 1×3 pixel circuits in the pixel array includes a plurality of first banks of the 1×3 pixel circuits coupled to a first bitline of a respective grouping of the 3 bitlines, a plurality of second banks of the 1×3 pixel circuits coupled to a second bitline of the respective grouping of the 3 bitlines, and a plurality of third banks of the 1×3 pixel circuits coupled to a third bitline of the respective grouping of the 3 bitlines. The pixel array is further organized into a plurality of 9 cell (9C) pixel structures such that each of the 9C pixel structure includes 3 1×3 pixel structures, which form a 3×3 pixel structure.

In the various examples, a color filter array is disposed over the pixel array. In one example, the color filter array includes red, green, and blue color filters arranged in a mosaic pattern such as a Bayer color filter array. such that each 9C pixel structure is under one of the color filters of the color filter array. In various examples, each 9C pixel structure is disposed under one of the color filters of the color filter array. In various examples the new 9C pixel structures are arranged into 2×2 groupings of 4 9C pixel structures, which form 6×6 pixel structures. As such, the four 9C pixel structures included in each 6×6 pixel structure are disposed under red, green, green, and blue color filters of the Bayer color filter array that is disposed over the pixel array. In various examples, the center 2×2 grouping of photodiodes included in the each 6×6 pixel structure may be configured to provide phase detection autofocus information from the pixel array.

As such, in the various examples, the pixel array may be configured to be read out as 9C binned pixels without phase detection information through all 3 bitlines per column simultaneously. In another example, the pixel array may be configured to be read out as 9C binned pixels with phase detection information through all 3 bitlines per column simultaneously. In yet another example, the pixel array may be configured to be read out as a full resolution or full-sized readout. In the example, one of the 3 bitlines per column is active while the remaining 2 bitlines of the 3 bitlines per column are idle or not used during the full-sized readout.

In various examples, clamp circuits with sample and hold circuits are coupled to the bitlines to clamp idled bitlines, which addresses the issue that can be introduced with the idle bitlines that are not clamped during the full sized or full resolution readouts. In particular, the idle bitlines would be capacitively coupled to active bitlines through parasitic capacitances in the 3 bitline pixel circuits since there is not enough space for shielding between bitlines. The coupling capacitance contributes to the loading of the active readout bitlines, which would degrade settling times. The idle bitlines would also degrade the power supply rejection ratio performance of the image sensor since the idle bitlines would be connected to the power line (e.g., AVDD). The resulting fluctuations in the power line would appear in the idle bitlines without much isolation, which would consequently be coupled back to the active bitlines through the coupling capacitance and degrade the power supply rejection ratio.

To illustrate, FIG. 1 shows one example of an imaging system 100 including 1×3 pixel circuits and coupled through bitlines to a readout circuit. In one example, clamp circuits and sample and hold circuits are coupled to the bitlines in accordance with the teachings of the present invention. In particular, the example depicted in FIG. 1 illustrates an imaging system 100 that includes a pixel array 102, bitlines 112, a control circuit 110, a readout circuit 106, and function logic 108. In one example, pixel array 102 is a two-dimensional (2D) array including a plurality of pixel circuits 104 (e.g., P1, P2, . . . , Pn) that are arranged into rows (e.g., R1 to Ry) and columns (e.g., C1 to Cx) to acquire image data of a person, place, object, etc., which can then be used to render an image of a person, place, object, etc.

In various examples, each pixel circuit 104 may include one or more photodiodes configured to photogenerate image charge in response to incident light. For instance, in one example, pixel circuit 104 may include 3 photodiodes such that each pixel circuit 104 is a 1×3 pixel circuit. As will be discussed, in various examples, there are 3 bitlines per column for each column of pixel circuits 104. The image charge generated in each photodiode is transferred to a floating diffusion included in each pixel circuit 104, which may be converted to an image signal, or in some circumstances to phase detection autofocus information, and then read out from each pixel circuit 104 by readout circuit 106 through column bitlines 112. As will be discussed, in the various examples, readout circuit 106 may be configured to read out 9C binned image data, phase detection autofocus data, and/or full resolution image data through column bitlines 112. In various examples, readout circuit 106 may include current sources, routing circuitry, and comparators that may be included in analog to digital converters or otherwise. In various examples, there are also clamp circuits and sample and hold circuits coupled to the bitlines to clamp the idled bitlines to improve bitline settling times and power supply rejection ratio.

In the example, the digital image data values generated by the analog to digital converters in readout circuit 106 may then be received by function logic 108. Function logic 108 may simply store the digital image data or even manipulate the digital image data by applying post image effects (e.g., crop, rotate, remove red eye, adjust brightness, adjust contrast, or otherwise).

In one example, control circuit 104 is coupled to pixel array 102 to control operation of the plurality of photodiodes in pixel array 102. For example, control circuit 104 may generate a rolling shutter or a shutter signal for controlling image acquisition. In other examples, image acquisition is synchronized with lighting effects such as a flash.

In one example, imaging system 100 may be included in a digital, cell phone, laptop computer, or the like. Additionally, imaging system 100 may be coupled to other pieces of hardware such as a processor (general purpose or otherwise), memory elements, output (USB port, wireless transmitter, HDMI port, etc.), lighting/flash, electrical input (keyboard, touch display, track pad, mouse, microphone, etc.), and/or display. Other pieces of hardware may deliver instructions to imaging system 100, extract image data from imaging system 100, or manipulate image data supplied by imaging system 100.

FIG. 2A illustrates one example schematic of a pixel circuit 204A included in an imaging system with a photodiode array in accordance with the teachings of the present invention. It is appreciated that the pixel circuit 204A of FIG. 2A may be an example of one of the pixel circuits 104 included in pixel array 102 as shown in FIG. 1, and that similarly named and numbered elements described above are coupled and function similarly below.

In the example depicted in FIG. 2A, pixel circuit 204A includes a photodiode 214-0 coupled to a transfer transistor 216-0, a photodiode 214-1 coupled to a transfer transistor 216-1, and a photodiode 214-2 coupled to a transfer transistor 216-2. Thus, each one of the plurality of transfer transistors 216-0 to 216-2 is coupled to a respective one of the plurality of photodiodes 214-0 to 214-2. In the depicted example, it is appreciated that the 3 photodiodes 214-0, 214-1, and 214-2 form a 1×3 pixel circuit 204A. In other words, in the various examples, the 3 photodiodes 214-0, 214-1, and 214-2 may be considered as a one column of 3 rows of photodiodes, or a 1×3 pixel circuit 204A. As will be discussed below, in the various examples, the readout of the 3 photodiodes 214-0, 214-1, and 214-2 may be binned together or may be read out individually for a full resolution readout. In another embodiment, one of the 3 photodiodes 214-0, 214-1, and 214-2 may be read out to provide phase detection autofocus information.

Continuing with the depicted example, a shared floating diffusion 218 is coupled to transfer transistor 216-0, transfer transistor 216-1, and transfer transistor 216-2. As such, each one of the plurality of transfer transistors 216-0 to 216-2 is coupled between a respective one of the plurality of photodiodes 214-0 to 214-2 and shared floating diffusion 218. As such, floating diffusion 218 is a shared floating diffusion that is configured to receive charge that is transferred from the plurality of photodiodes 214-0 to 214-2.

In operation, transfer transistor 216-0 is coupled to be controlled in response to a transfer control signal TX0, transfer transistor 216-1 is coupled to be controlled in response to a transfer control signal TX1, and transfer transistor 216-2 is coupled to be controlled in response to a transfer control signal TX2. As such, charge photogenerated in photodiode 214-0 in response to incident light is transferred to shared floating diffusion 218 in response to transfer control signal TX0, charge photogenerated in photodiode 214-1 in response to incident light is transferred to shared floating diffusion 218 in response to transfer control signal TX1, and charge photogenerated in photodiode 214-2 in response to incident light is transferred to shared floating diffusion 218 in response to transfer control signal TX2.

In the example, a dual floating diffusion transistor 224 is also coupled to shared floating diffusion 218, and a dual floating diffusion capacitor $C_{DFD}$ 228 is coupled to dual floating diffusion transistor 224 as shown. In the example, the dual floating diffusion transistor 224 may be switched on and off in response to a dual floating diffusion signal DFD to switch between low conversion gain or high conversion gain readouts to increase the dynamic range of the image sensor. In the example, a reset transistor 226 is coupled between a voltage supply (e.g., AVDD) and the dual floating diffusion transistor 224. In operation, the reset transistor 320 is configured to reset pixel circuit 204A including the dual floating diffusion capacitor $C_{DFD}$ 228 and the charge in shared floating diffusion 218 in response to a reset control signal RST.

In the illustrated example, a gate of a source follower transistor 220 is coupled to the shared floating diffusion 218. In the example, the drain of the source follower transistor 220 is coupled to the voltage supply (e.g., AVDD), and the source of source follower transistor 220 is coupled to a first column bitline BL0 212-0 through a row select transistor 222. Thus, in other words, the source follower transistor 220 and the row select transistor 222 are coupled between the voltage supply (e.g., AVDD) and the first column bitline 212-0. In operation, the row select transistor 222 is configured to output a signal that is representative of the charge in shared floating diffusion 218 from the source follower transistor 220 of pixel circuit 204A to the first column bitline 212-0 in response to a row select signal RS.

As shown in the depicted example, there are 3 column bitlines per column of BL0 212-0, BL1 212-1, and BL2 212-2 per column of pixel cells 204A. As mentioned, pixel cell 204A is coupled to the first bitline BL0 212-0. As such, since pixel cell 204A is coupled to the first bitline BL0 212-0 of the 3 bitlines BL0 212-0, BL1 212-1, and BL2 212-2 per column of pixel cells, pixel cell 204A is considered to be included in a first grouping or a first bank of pixel cells, which is referred to as bank 0 in this disclosure. As will be shown in FIGS. 2B-2C below, a pixel cell 204B coupled to the second bitline BL1 212-1 of the 3 bitlines BL0 212-0, BL1 212-1, and BL2 212-2 per column of pixel cells is considered to be included in bank 1. Similarly, a pixel cell 204C coupled to the third bitline BL2 212-2 of the 3 bitlines BL0 212-0, BL1 212-1, and BL2 212-2 per column of pixel cells is considered to be included in bank 2.

To illustrate, FIG. 2B illustrates one example schematic of a pixel circuit 204B included in an imaging system with a photodiode array in accordance with the teachings of the present invention. It is appreciated that the pixel circuit 204B of FIG. 2B may be another example of one of the pixel circuits 104 included in pixel array 102 as shown in FIG. 1, and that similarly named and numbered elements described above are coupled and function similarly below.

It is further appreciated that the pixel circuit 204B of FIG. 2B shares many similarities with the pixel circuit 204A of FIG. 2A. For instance, there are 3 column bitlines BL0 212-0, BL1 212-1, and BL2 212-2 per column of pixel cells 204B. However, the difference between pixel circuit 204B of FIG. 2B and pixel circuit 204A of FIG. 2A is that in the pixel circuit 204B of FIG. 2B, the source of source follower transistor 220 is coupled to the second column bitline BL1 212-1 through a row select transistor 222 instead of the first column bitline BL0 212-0 of the 3 bitlines BL0 212-0, BL1 212-1, and BL2 212-2 per column of pixel cells as in pixel circuit 204A of FIG. 2A. In one example, pixel circuit 204A of FIG. 2A and pixel circuit 204B of FIG. 2B may be in the same column of the same pixel array with the same 3 column bitlines BL0 212-0, BL1 212-1, and BL2 212-2 per column of pixel cells 204B. However, since pixel cell 204B is coupled to the second bitline BL0 212-1, pixel cell 204B is considered to be included in a second grouping or a second bank of pixel cells, which is referred to as bank 1 in this disclosure.

Figure 2C:
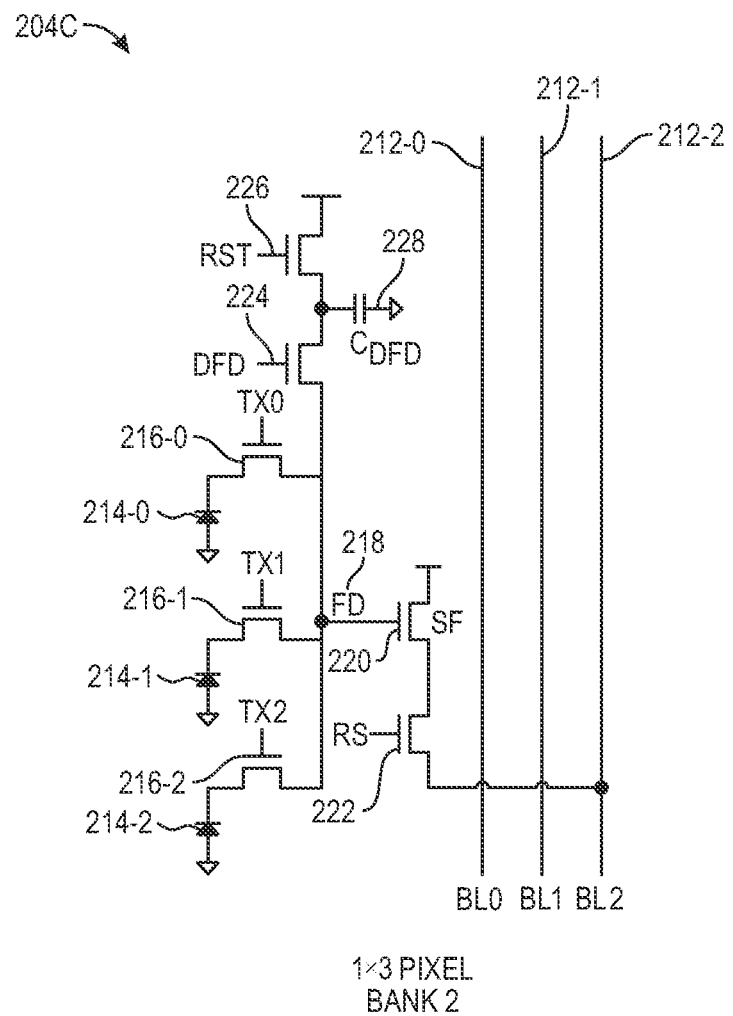
FIG. 2C illustrates a one example of a schematic of a 1×3 pixel circuit coupled to a third bitline of a grouping of 3 bitlines per column of a pixel array in accordance with the teachings of the present disclosure.

FIG. 2C illustrates one example schematic of a pixel circuit 204C included in an imaging system with a photodiode array in accordance with the teachings of the present invention. It is appreciated that the pixel circuit 204C of FIG. 2C may be yet another example of one of the pixel circuits 104 included in pixel array 102 as shown in FIG. 1, and that similarly named and numbered elements described above are coupled and function similarly below.

It is further appreciated that the pixel circuit 204C of FIG. 2C shares many similarities with the pixel circuit 204B of FIG. 2B as well as the pixel circuit 204A of FIG. 2A. For instance, there are 3 column bitlines BL0 212-0, BL1 212-1, and BL2 212-2 per column of pixel cells 204C. However, the difference between pixel circuit 204C of FIG. 2C and pixel circuit 204B of FIG. 2B and pixel circuit 204A of FIG. 2A is that in the pixel circuit 204C of FIG. 2C, the source of source follower transistor 220 is coupled to the third column bitline BL2 212-2 through a row select transistor 222 instead of the second column bitline BL1 212-1 of the 3 bitlines BL0 212-0, BL1 212-1, and BL2 212-2 per column of pixel cells as in pixel circuit 204B of FIG. 2B, or instead of the first column bitline BL0 212-0 of the 3 bitlines BL0 212-0, BL1 212-1, and BL2 212-2 per column of pixel cells as in pixel circuit 204A of FIG. 2A. In one example, pixel circuit 204A of FIG. 2A, pixel circuit 204B of FIG. 2B, and pixel circuit 204C of FIG. 2C may be in the same column of the same pixel array with the same 3 column bitlines BL0 212-0, BL1 212-1, and BL2 212-2 per column of pixel cells 204C. However, since pixel cell 204C is coupled to the second bitline BL0 212-0, pixel cell 204C is considered to be included in a third grouping or a third bank of pixel cells, which is referred to as bank 2 in this disclosure.

Figure 2D:
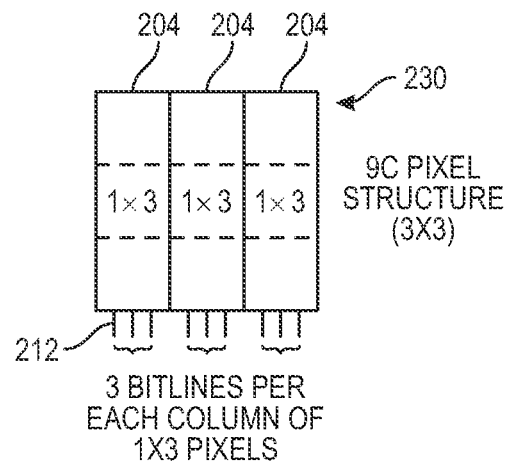
FIG. 2D illustrates a one example of a 9 cell 3×3 pixel structure including 3 1×3 pixel circuits of a pixel array in accordance with the teachings of the present disclosure.

FIG. 2D illustrates a one example of a 9 cell 3×3 pixel structure 230 including 3 1×3 pixel circuits of a pixel array in accordance with the teachings of the present disclosure. Specifically, the example depicted in FIG. 2D shows a 9 cell (9C) pixel structure 230, which may be considered 3×3 pixel structure that includes 3 1×3 pixel circuits 204 arranged side by side as shown to form 3 columns and 3 rows of photodiodes. It is appreciated that the 3 1×3 pixel circuits 204 of FIG. 2B may be examples of pixel circuit 204A of FIG. 2A, of pixel circuit 204B of FIG. 2B, or of pixel circuit 204C of FIG. 2C, and that similarly named and numbered elements described above are coupled and function similarly below. As such, it is further appreciated that each of the 3 1×3 pixel circuits 204 include 3 bitlines (e.g., BL0 212-0, BL1 212-1, BL2 212-2) per column of 1×3 pixel circuits 204.

Figure 2E:
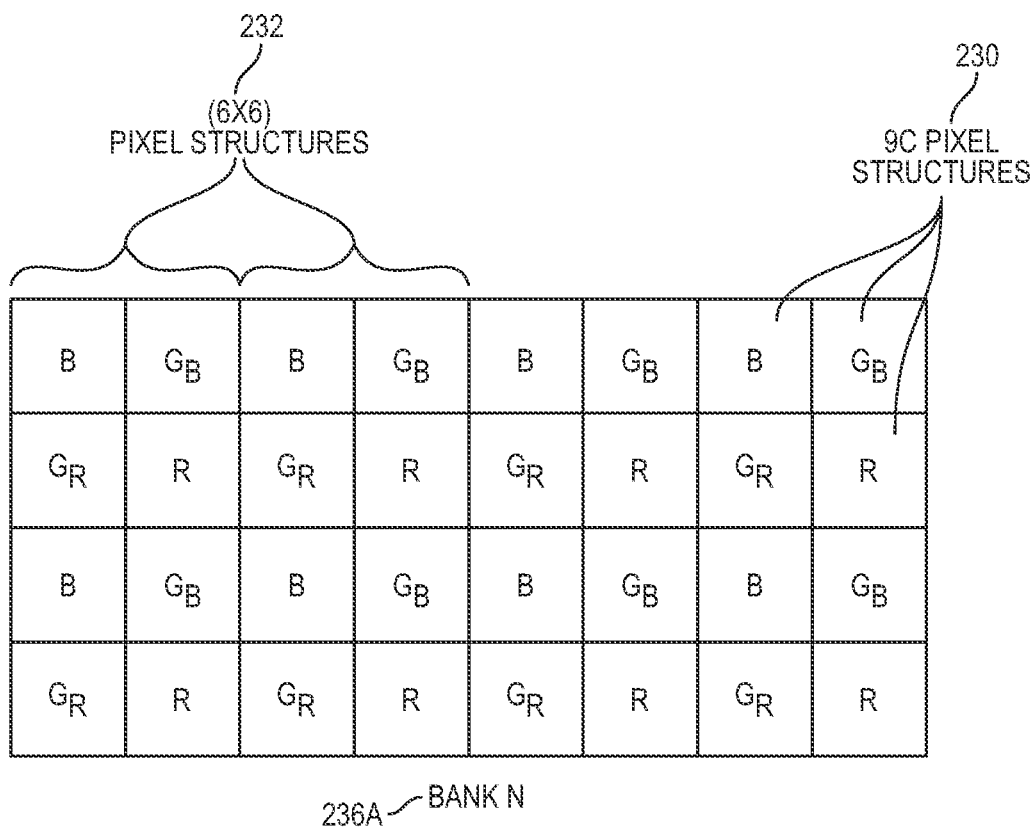
FIG. 2E illustrates a one example of a bank of 9 cell 3×3 pixel structures of a pixel array in accordance with the teachings of the present disclosure.

FIG. 2E illustrates a one example of a bank N 236A of 9 cell (9C) 3×3 pixel structures of a pixel array in accordance with the teachings of the present disclosure. In the various examples, bank N 236A includes 9C pixel structures 230 that are arranged in the rows and columns of the pixel array. It is appreciated that the 9C pixel structures 230 depicted in FIG. 2E may be examples of the 9C pixel structure 230 depicted in FIG. 2D, and that similarly named and numbered elements described above are coupled and function similarly below. In various examples, N=0, 1, or 2 (e.g., bank 0, bank 1, bank 2) such that the 1×3 pixel circuits included in each 9C pixel structure of bank N 236A are all coupled to either the first bitline BL0 212-0, the second bitline BL1 212-1, or the third bitline BL2 212-2 as discussed in detail above.

The example depicted in FIG. 2E also illustrates a color filter array disposed over the pixel array. In the example, the color filter array includes an array of color filters arranged in a mosaic of three colors such as red, green, and blue color filters. In one example, the color filter array may be a Bayer color filter array such that the color filters are arranged in a repeating pattern of 2×2 squares of color filters with repeating blue and green color filters in one row and repeating green and red color filters in a neighboring row.

As shown in the example illustrated in FIG. 2E, each one of the 9C pixel structures is disposed under one of the color filters of the color filter array. In the depicted example, blue color filters are indicated with a B label, the green color filters in the same rows as the blue color filters are indicated with a $G_B$ label, the red color filters are indicated with an R label, and the green color filters in the same rows as the red color filters are indicated with a $G_R$ label. As such, it is appreciated that the color filters along one diagonal of the pattern of 2×2 squares of color filters are blue (B) and red (R), while the color filters along the other diagonal of the pattern of 2×2 squares of color filters are both green ($G_B$ and $G_R$).

It is appreciated that each 2×2 square of color filters is disposed over a corresponding 2×2 square of 9C pixel structures 230. As such, since each 9C pixel structure 230 includes 3 1×3 pixel circuits 204 arranged side by side as discussed in FIG. 2D, each 2×2 square of color 9C pixel structures 230 forms a 6×6 pixel structure 232, which is formed with 4 9C pixel structures 230, or 12 1×3 pixel circuits 204.

Figure 2F:
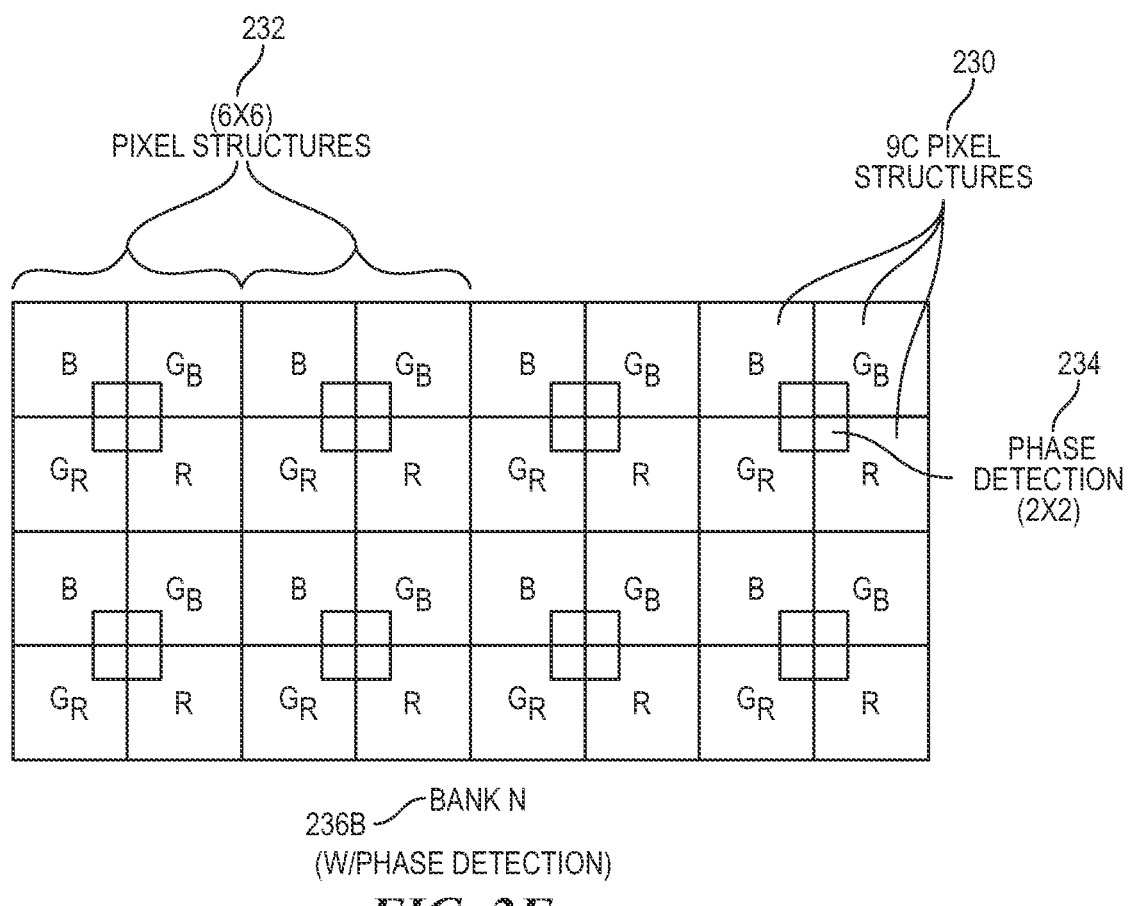
FIG. 2F illustrates a one example of a bank of 9 cell 3×3 pixel structures that include phase detection autofocus photodiodes included in a center 2×2 grouping of photodiodes included in each 6×6 pixel structure in a pixel array in accordance with the teachings of the present disclosure.

FIG. 2F illustrates a one example of a bank N 236B of 9 cell 3×3 pixel structures that include phase detection autofocus photodiodes included in a center 2×2 grouping of photodiodes included in each 6×6 pixel structure in a pixel array in accordance with the teachings of the present disclosure. In particular, FIG. 2F illustrates a bank N 236B of a pixel array that includes 9C pixel structures 230 arranged in the rows and columns of the pixel array. It is appreciated that bank N 236B of FIG. 2F shares many similarities with the bank N 236A of 9C pixel structures 230 discussed above in FIG. 2E. For instance, similar to bank N 236A of FIG. 2E, bank N 236B of FIG. 2F also includes 6×6 pixel structures 232 that are formed with 4 9C pixel structures 230, or 12 1×3 pixel circuits 204. In addition, each of the 9C pixel structures 230 is disposed under one of the color filters (e.g., B, $G_B$, $G_R$, R) of the color filter array that is disposed over the pixel array.

A difference between the bank N 236B of FIG. 2F and bank N 236A of FIG. 2E is that some of the photodiodes included in bank N 236B of FIG. 2F may be configured to provide phase detection information for the pixel array. For instance, as shown in the example depicted in FIG. 2F, a center 2×2 grouping of photodiodes 234 of each 6×6 pixel structure 232 is configurable to provide phase detection autofocus information. It is appreciated that in the depicted example, each of the center 2×2 grouping of photodiodes 234 of each 6×6 pixel structure 232 is disposed in a respective inside corner of each of the included 4 9C pixel structures 230. As such, in the examples described herein, the 4 photodiodes included in each center 2×2 grouping of photodiodes 234 are disposed under respective B, $G_B$, $G_R$, R color filters. In other examples, it is appreciated that the 4 photodiodes included in each center 2×2 grouping of photodiodes 234 may all be disposed under green color filters, or panchromatic filters, etc.

Figure 3:
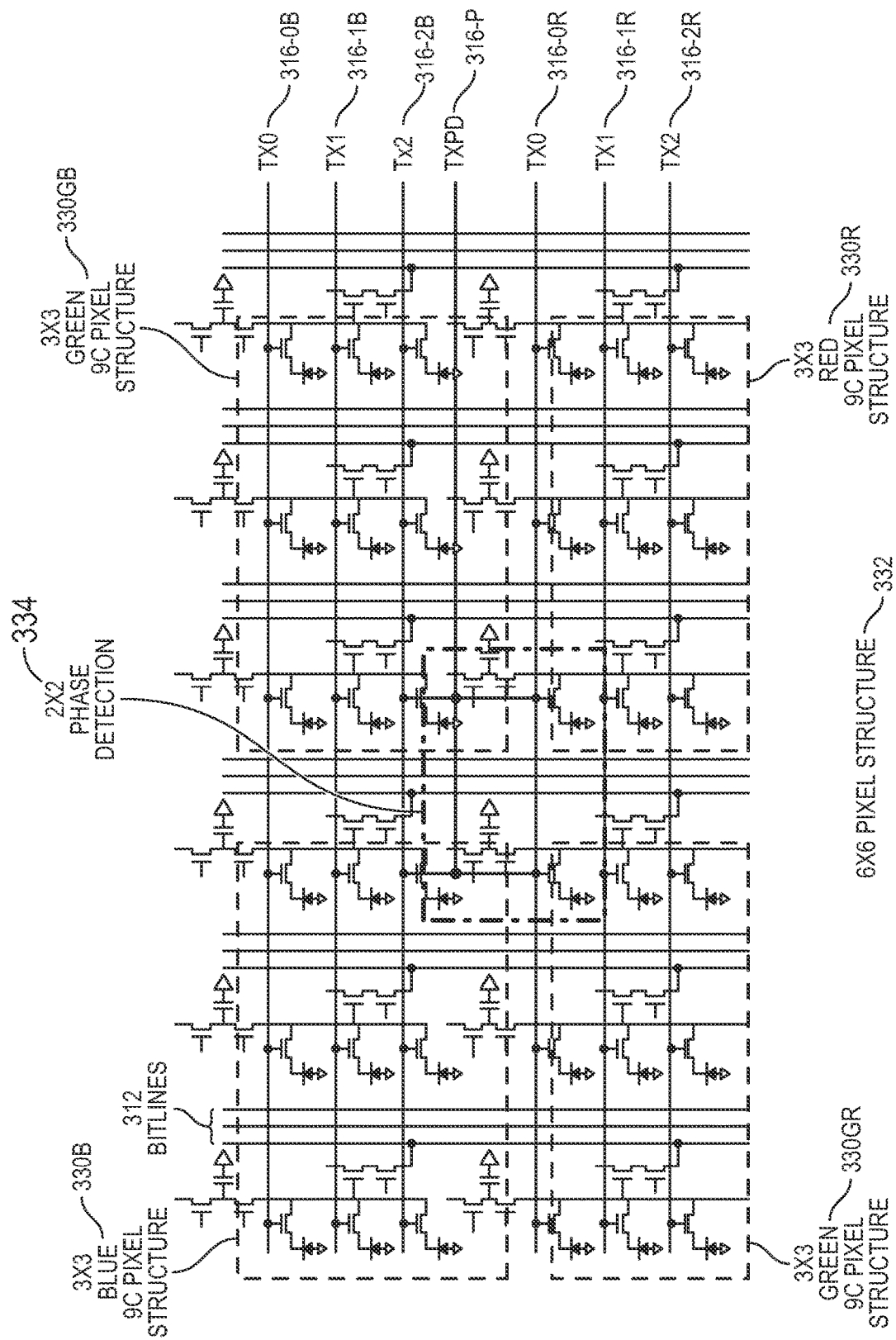
FIG. 3 illustrates a detailed schematic of one example of a 6×6 pixel structure including 4 9 cell 3×3 pixel structures that include a 2×2 arrangement of phase detection autofocus photodiodes included in a center 2×2 grouping of photodiodes included in each 6×6 pixel structure in a pixel array in accordance with the teachings of the present disclosure.

FIG. 3 illustrates a detailed schematic of one example of a 6×6 pixel structure 332 including 4 9 cell 3×3 pixel structures that include a 2×2 arrangement of phase detection autofocus photodiodes included in a center 2×2 grouping of photodiodes included in each 6×6 pixel structure 332 in a pixel array in accordance with the teachings of the present disclosure. It is appreciated that the 6×6 pixel structure 332 of FIG. 3 may be a detailed example of one of the 6×6 pixel structures 232 illustrated in FIGS. 2E-2F, and that similarly named and numbered elements described above are coupled and function similarly below.

In the example depicted in FIG. 3, 6×6 pixel structure 332 is illustrated as including a 3×3 blue 9C pixel structure 330B, a 3×3 green 9C pixel structure 330GB in the same row as the 3×3 blue 9C pixel structure 330G, a 3×3 red 9C pixel structure 330, and a 3×3 green 9C pixel structure 330GR in the same row as the 3×3 red 9C pixel structure 330. In the depicted example, a 2×2 phase detection 334 portion is located in the center 2×2 grouping of photodiodes to provide phase detection information for the pixel array. In the depicted example, the 4 photodiodes included in the center 2×2 grouping of photodiodes are illustrated as being disposed under respective B, $G_B$, $G_R$, R color filters. In other examples, it is appreciated that the 4 photodiodes included in each center 2×2 grouping of photodiodes 234 may all be disposed under green color filters, or panchromatic filters, etc.

The depicted example also illustrates that each column of photodiodes included in each respective 1×3 pixel circuit (e.g., 1×3 pixel circuit 204) is coupled to one of 3 bitlines 312 per column of 1×3 pixel circuits. In the example depicted in FIG. 3, it is appreciated that all of the 1×3 pixel circuits are coupled to the first bitline (e.g., BL0 212-0). As such, it is appreciated that the example 6×6 pixel structure 332 depicted in FIG. 3 is included in bank 0. In comparison, if all of the 1×3 pixel circuits were coupled to the second bitline (e.g., BL1 212-1), then the example pixel 6×6 pixel structure would be included in bank 1. Similarly, if all of the 1×3 pixel circuits were coupled to the third bitline (e.g., BL2 212-2), then the example pixel 6×6 pixel structure would be included in bank 2.

The example depicted in FIG. 3 also illustrates that a first transfer control signal TX0 316-0B is coupled to control the first transfer control transistors in the row of 1×3 pixel circuits including the 3×3 blue 9C pixel structure 330B, a second transfer control signal TX1 316-1B is coupled to control the second transfer control transistors in the row of 1×3 pixel circuits including the 3×3 blue 9C pixel structure 330B, and a third transfer control signal TX2 316-2B is coupled to control the third transfer control transistors in the row of 1×3 pixel circuits including the 3×3 blue 9C pixel structure 330B. Similarly, a first transfer control signal TX0 316-0R is coupled to control the first transfer control transistors in the row of 1×3 pixel circuits including the 3×3 red 9C pixel structure 330R, a second transfer control signal TX1 316-1R is coupled to control the second transfer control transistors in the row of 1×3 pixel circuits including the 3×3 red 9C pixel structure 330R, and a third transfer control signal TX2 316-2R is coupled to control the third transfer control transistors in the row of 1×3 pixel circuits including the 3×3 red 9C pixel structure 330R. The example depicted in FIG. 3 further illustrates that a phase detection transfer control signal TXPD 316-P is coupled to control the transfer control transistors coupled to the center 2×2 grouping of photodiodes included in the 6×6 pixel structure 332.

Figure 4:
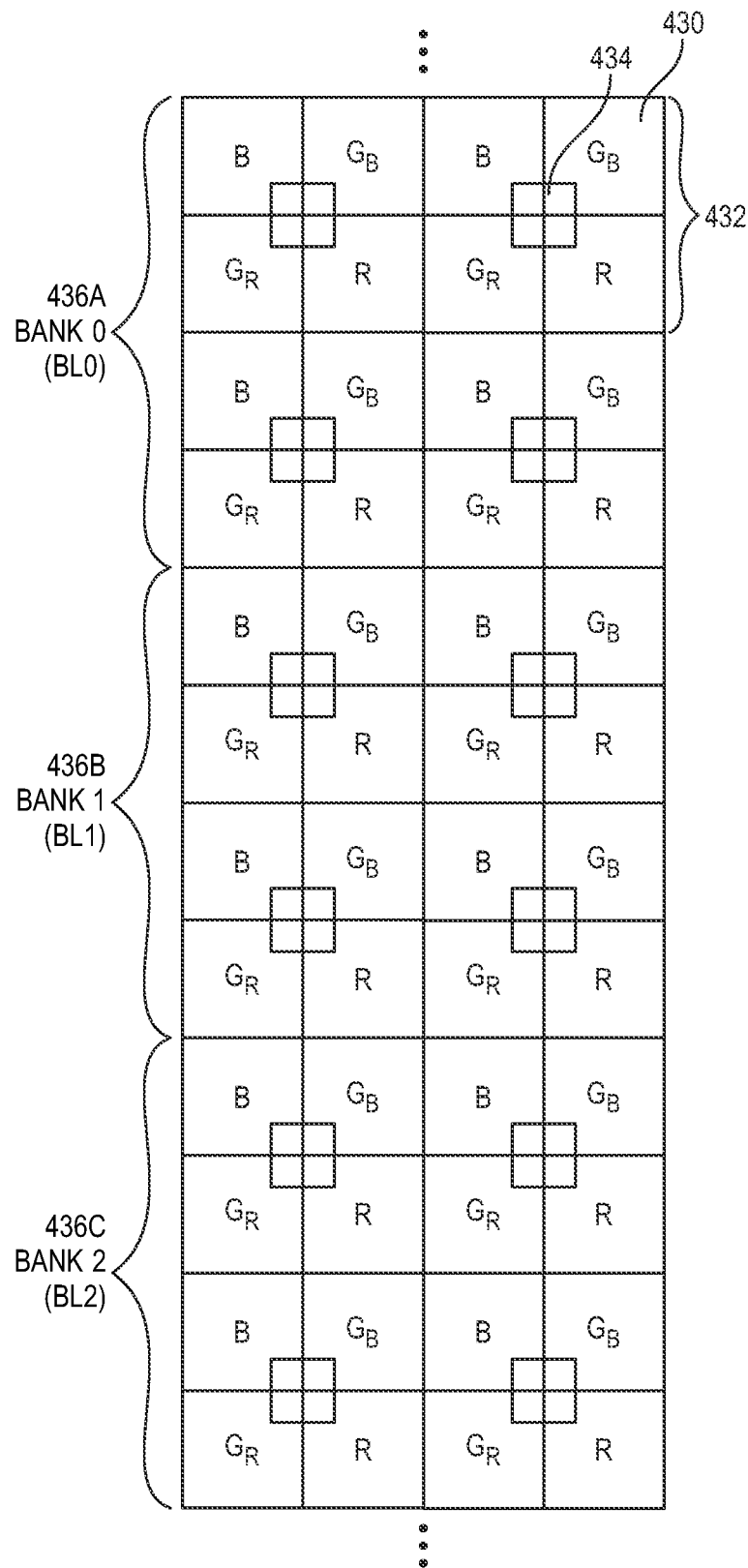
FIG. 4 illustrates one example of 6×6 pixel structures including 9 cell 3×3 pixel structures and 2×2 groupings of phase detection autofocus photodiodes that are arranged along the rows of a pixel array in a repeating sequence of first banks, second banks, and then third banks of pixel circuit in the pixel array in accordance with the teachings of the present disclosure.

FIG. 4 illustrates one example of banks 436A, 436B, 436C of 6×6 pixel structures 432 including 9 cell 3×3 pixel structures 430 and center 2×2 groupings of phase detection autofocus photodiodes 434 that are arranged along the rows of a pixel array in a repeating sequence of first banks, second banks, and then third banks of pixel circuits in the pixel array in accordance with the teachings of the present disclosure. In other words, the example depicted in FIG. 4 shows that bank 0 436A, bank 1 436B, and bank 2 436C are arranged along rows of the pixel array in a repeating sequence. It is appreciated that the banks 436A, 436B, 436C depicted in FIG. 4 may each be an example of the banks 236A, 236B shown in FIGS. 2E-2F, and that similarly named and numbered elements described above are coupled and function similarly below. As discussed above, each of the 1×3 pixel circuits included in bank 0 436A is coupled to the first bitline BL0 (e.g., BL0 212-0), each of the 1×3 pixel circuits included in bank 1 436B is coupled to the second bitline BL1 (e.g., BL1 212-1), and each of the 1×3 pixel circuits included in bank 2 436C is coupled to the third bitline BL2 (e.g., BL0 212-2).

Figure 5:
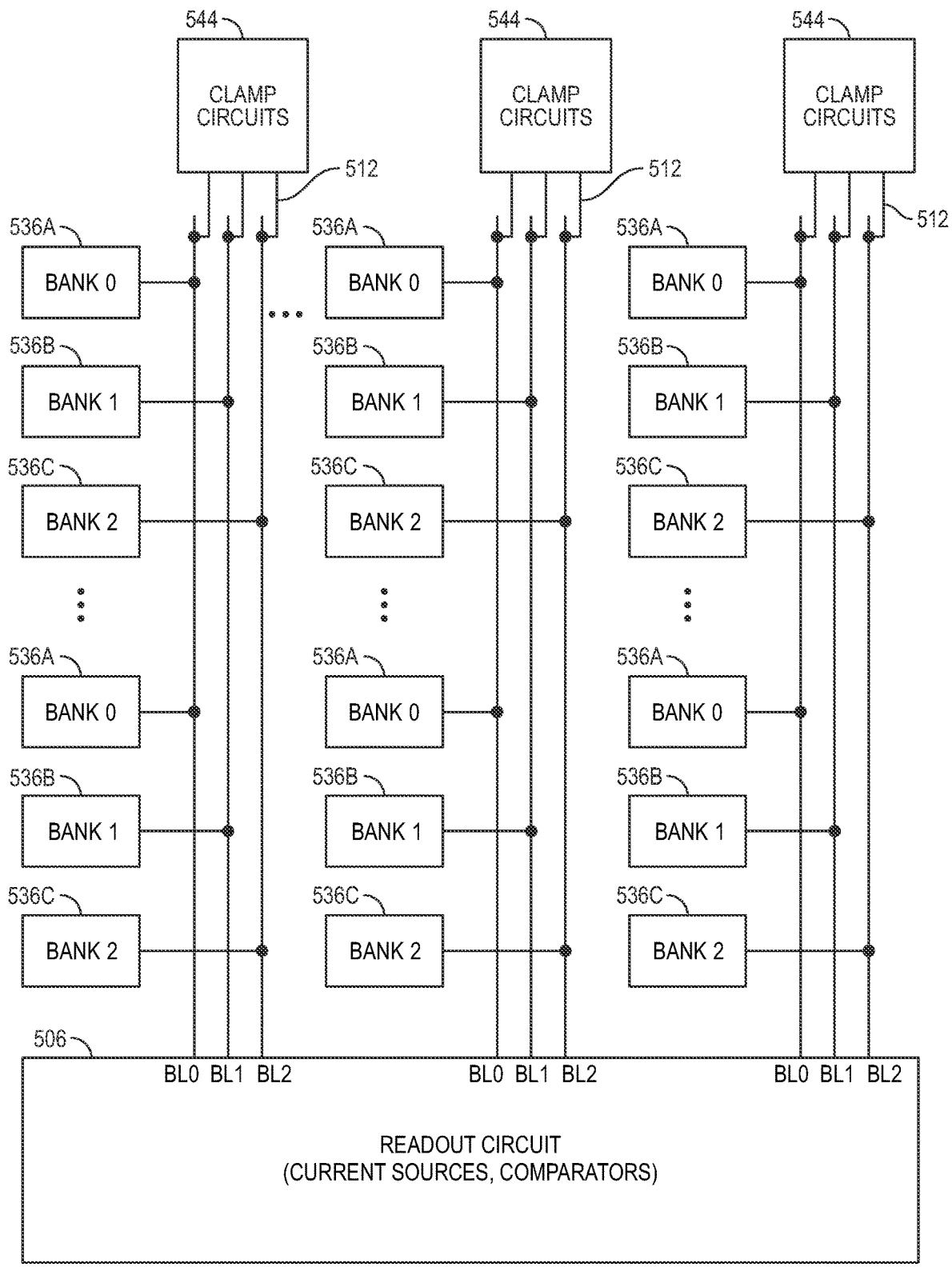
FIG. 5 illustrates a diagram of one example of clamp circuits coupled to bitlines that are coupled to respective banks of pixel circuits and a readout circuit of a pixel array in accordance with the teachings of the present disclosure.

FIG. 5 illustrates a diagram of one example of clamp circuits 544 coupled to bitlines 512 that are coupled to respective banks of pixel circuits 536A, 536B, 536C and a readout circuit of a pixel array in accordance with the teachings of the present disclosure. It is appreciated that the banks of pixel circuits 536A, 536B, 536C and bitlines of FIG. 5 may be a examples of the banks of pixel circuits and bitlines discussed above in FIGS. 1-4, and that similarly named and numbered elements described above are coupled and function similarly below.

As shown in the depicted example, clamp circuits 544 are coupled to bitlines 512. In the example, the bitlines 512 include groupings of 3 bitlines (e.g., BL0, BL1, BL2). In the various examples, the bank 0 536A pixel circuits are coupled to the first bitline BL0 of the bitlines 512, the bank 2 536B pixel circuits are coupled to the second bitline BL1 of the bitlines 512, and the bank 3 536C pixel circuits are coupled to the third bitline BL1 of the bitlines 512. As shown in the example, the readout circuit 506 is coupled to the bitlines 512 to readout the banks of pixel circuits 536A, 536B, 536C. In various examples, the readout circuit 506 may be configured to perform a 9C binned readout of the banks of pixel circuits 536A, 536B, 536C. When performing a 9C binned readout, all 3 banks of pixel circuits 536A, 536B, 536C may be readout simultaneously through respective bitlines BL0, BL1, BL2.

In another example, a full size or full resolution readout of the banks of pixel circuits 536A, 536B, 536C may be performed. However, for a full size or full resolution readout, only one bank of pixel circuits is readout at a time. In other words, during a full-size readout, while bank 0 536A is readout through bitline BL0, bitlines BL1 and BL2 are idle or not used. While bank 1 536B is readout through bitline BL1, bitlines BL0 and BL2 are idle or not used. While bank 2 536C is readout through bitline BL2, bitlines BL0 and BL1 are idle or not used. In operation, clamp circuits 544 are configured to claim the idle bitlines BL0, BL1, or BL2 to improve settling times and power supply rejection ratio in accordance with the teachings of the present invention.

Figure 6:
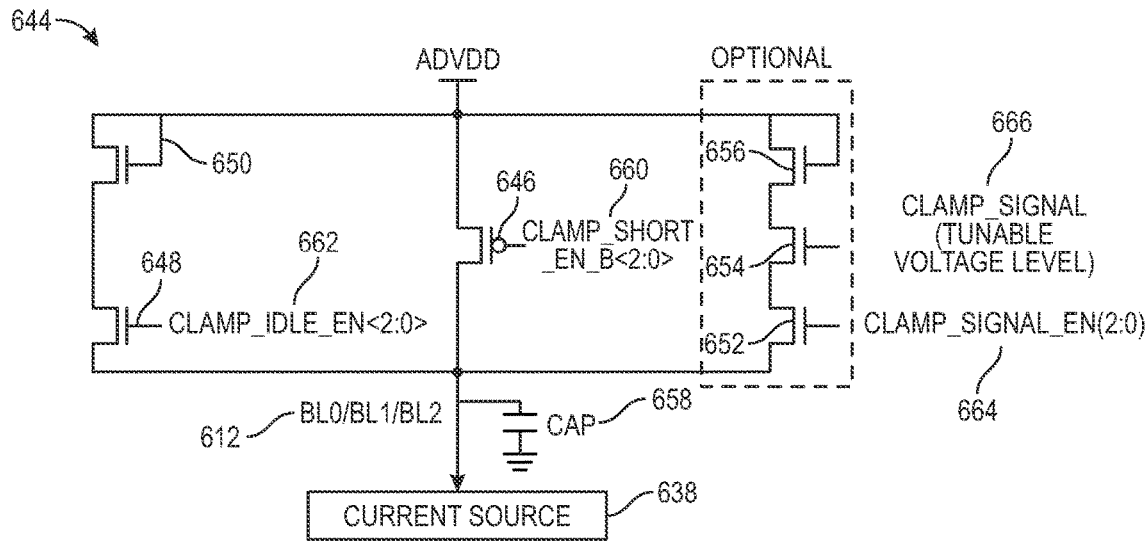
FIG. 6 illustrates a schematic of one example of a clamp circuit coupled to a bitline that is coupled to a capacitance and a current source of a readout circuit of a pixel array in accordance with the teachings of the present disclosure.

To illustrate, FIG. 6 shows a schematic of one example of a clamp circuit 644 coupled to a bitline 612 that is coupled to a capacitance and a current source of a readout circuit of a pixel array in accordance with the teachings of the present disclosure. It is appreciated that the clamp circuit 644 of FIG. 6 may be an example of one of the clamp circuits 544 illustrated in FIG. 5, and that similarly named and numbered elements described above are coupled and function similarly below.

As shown in the example depicted in FIG. 6, clamp circuit 644 includes a clamp short transistor 646 to a power line ADVDD and bitline 612. In the example, the bitline 612 may be one of the grouping of 3 bitlines BL0, BL1, BL2, and is coupled to a current source 638 and a capacitance CAP 658. In one example, the capacitance CAP 658 may be a parasitic capacitance. In one example, the clamp short transistor 646 is configured to be switched in response to a clamp short enable signal 660. In the depicted example, the clamp short transistor 646 is implemented with a PMOS transistor.

In the example, the clamp circuit 644 further includes a first diode drop device 650 coupled to the power line ADVDD and a clamp idle transistor 648 coupled to the first diode drop device 650 such that the first diode drop device and the clam idle transistor are coupled between the power line ADVDD and the bitline 612. In the example, the first diode drop device 650 is implemented with an NMOS transistor having a gate and drain coupled to the power line ADVDD, and the clamp idle transistor 646 is implemented with an NMOS transistor. In one example, the clamp idle transistor 646 is configured to be switched in response to a clamp idle enable signal 662.

In one example, the clamp circuit 644 may also optionally include a second diode drop device 656 coupled to the power line ADVDD, a tunable voltage level transistor 654 coupled to the second diode drop device 656, and a clamp signal transistor 652 coupled to the tunable voltage level transistor 654 such that the second diode drop device 656, the tunable voltage level transistor 654, and the clamp signal transistor 656 are coupled between the power line ADVDD and the bitline 612. In the example, the second diode drop device 656 is implemented with an NMOS transistor having a gate and drain coupled to the power line ADVDD, and the tunable voltage level transistor 654 and clamp signal transistor 652 are implemented with NMOS transistors. In the example, the clamp signal transistor 654 is configured to be biased in response to a tunable voltage level signal 666 and the clamp signal transistor 656 and is configured to be switched in response to a clamp signal enable signal 664.

In operation, it is appreciated that the clamp circuit 644 may be utilized to clamp idle bitlines 612 that are not used. As will be discussed, clamp circuit 644 may be configured to support clamping the bitline 612 to ADVDD through clamp short transistor 646, or clamping the bitline 612 to ADVDD with a diode drop through first diode drop device 650 and clamp idle transistor 648, or optionally clamping the bitline 612 to a tunable voltage level option through second diode drop device 656, a tunable voltage level transistor 654, and clamp signal transistor 652. As will be discussed, clamp circuit 644 may also support a sample and hold function such that the idle bitline 612 can be clamped by the sample and hold voltage that is maintained by the parasitic capacitance such as CAP 658.

Figure 7:
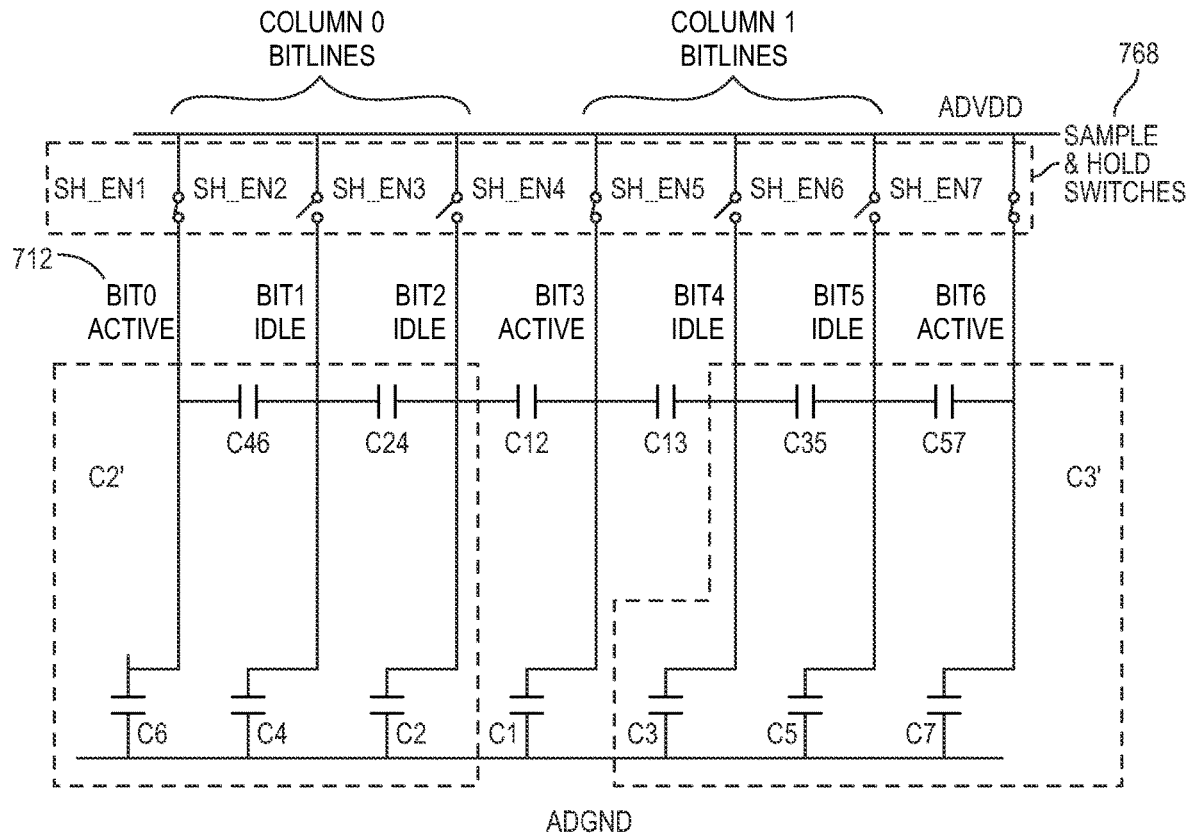
FIG. 7 illustrates a schematic of one example of sample and hold switches coupled to bitlines that are coupled to capacitances in a pixel array in accordance with the teachings of the present disclosure.

To illustrate, FIG. 7 illustrates a schematic of one example of sample and hold switches 768 coupled to bitlines 712 that are coupled to capacitances in a pixel array in accordance with the teachings of the present disclosure. It is appreciated that the bitlines 712 depicted in FIG. 7 may be examples of the bitline 612 depicted in FIG. 6, and that similarly named and numbered elements described above are coupled and function similarly below.

As shown in the example depicted in FIG. 7, each one of the plurality of sample and hold switches is coupled between the power line ADVDD and the respective one of the plurality of bitlines 712. In the example, each one of the plurality of sample and hold switches 768 is configured to be switched in response to a corresponding sample and hold enable signal (e.g., SH_en1, SH_en2, SH_en3, SH_en4, SH_en5, SH_en6, SH_en7). In the illustrated example, the bitlines 712 are representative of a first bit BIT0, a second bit BIT1, a third bit BIT2, a fourth bit BIT3, a fifth bit BIT4, a sixth bit BIT5, and a seventh bit BIT6. In the example, bitlines BIT0, BIT1, and BIT2 are a grouping of 3 bitlines of a column 0 of 1×3 pixel circuits and bitlines BIT3, BIT4, and BIT5 are a grouping of 3 bitlines of a column 1 of 1×3 pixel circuits, etc. The depicted example also illustrates the capacitances C6, C4, C2, C1, C3, C5, C7 between the respective bitlines BIT0, BIT1, BIT2, BIT3, BIT4, BIT5, BIT6 and ground ADGND. In addition, the depicted example also illustrates the capacitances C46, C24, C12, C13, C35, C57 between bitlines BIT0/BIT1, BIT1/BIT2, BIT2/BIT3, BIT3/BIT4, BIT4/BIT5, BIT5/BIT6, respectively.

In the example, a full size or full resolution readout of the pixel array is being performed. thus, only one 1 (e.g., BIT0, BIT3, BIT6, etc.) of the 3 bitlines per column of 1×3 pixel circuits is active or used at a time and the remaining 2 bitlines (e.g., BIT1/BIT2, BIT4/BIT5, etc.) of the 3 bitlines per column are idle or not used. As such, the sample and hold switches 768 that are coupled to active bitlines (e.g., BIT0, BIT3, BIT6) are activated or turned on in response to the corresponding sample and hold enable signal (e.g., SH_en1, SH_en4, SH_en7), the sample and hold switches 768 that are coupled to idle bitlines (e.g., BIT1, BIT2, BIT4, BIT5) are deactivated or turned off in response to the corresponding sample and hold enable signal (e.g., SH_en2, SH_en3, SH_en5, SH_en6).

The example illustrated in FIG. 7 illustrates the capacitive loading of the active bitline BIT3 during the readout. Specifically, with the sample and hold enable switches coupled to the bitlines BIT1, BIT2, BIT4, BIT5 turned off, the capacitive loading on bitline BIT3 is $$C1 + \frac{C12 \cdot C2'}{C12 + C2'} + \frac{C13 \cdot C3'}{C13 + C3'} \quad (1)$$

In equation 1, the capacitance C2' represents the total capacitive effect of C6, C46, C4, C24, and C2, and the capacitance C3' represents the total capacitive effect of C7, C57, C5, C35, and C3.

Figure 8A:
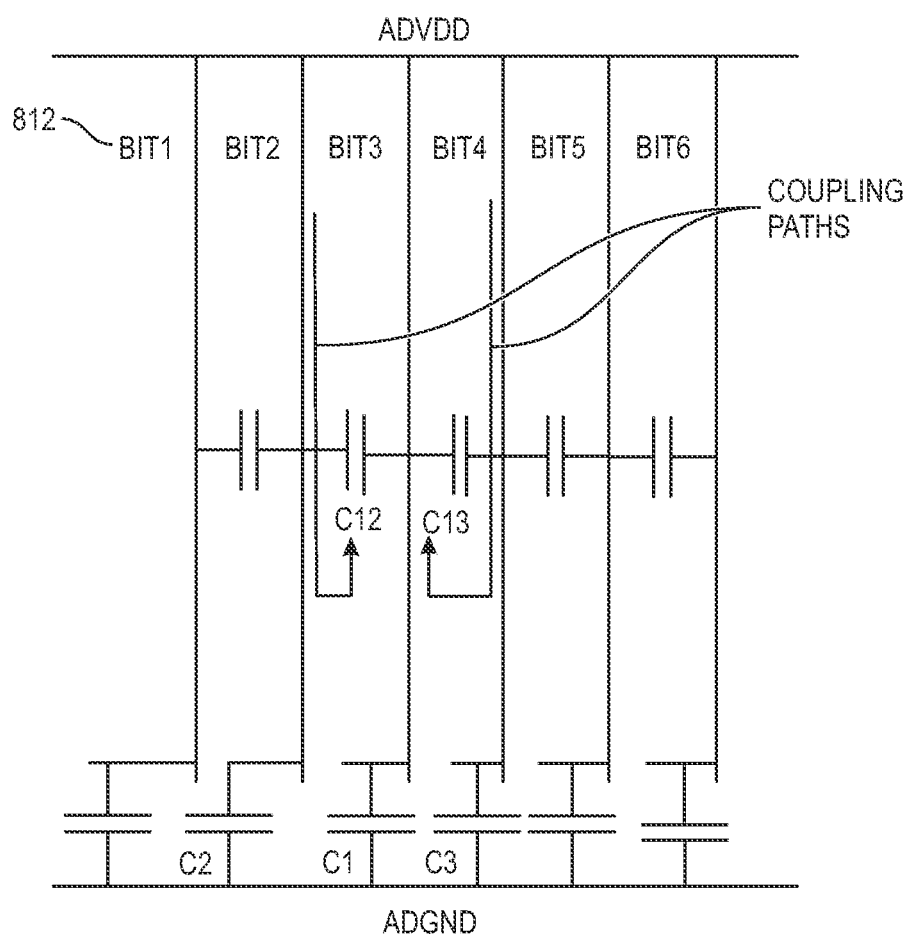
FIG. 8A illustrates an example of coupling paths through capacitively coupled bitlines without sample and hold switches in a pixel array.

In comparison, FIG. 8A illustrates an example of the coupling paths through capacitively coupled bitlines 812 without sample and hold switches in a pixel array. It is appreciated that the bitlines 812 depicted in FIG. 7 may be examples of the bitlines 712 depicted in FIG. 7 but without the sample and hold switches 768, and that similarly named and numbered elements described above are coupled and function similarly below.

As shown in the example depicted in FIG. 8, without the sample and hold switches 768, the bitlines BIT1, BIT2, BIT3, BIT4, BIT5, BIT6 all remain coupled to the power line ADVDD whether or not the respective bitline is active or idle. As result, when bitline BIT3 is active, neighboring bitlines BIT2 an BIT4 remain coupled to the power line ADVDD creating coupling paths between the power ADVDD and bitline BIT3 through neighboring bitlines BIT2 an BIT4. Consequently, the capacitive loading on bitline BIT3 as illustrated in FIG. 8 is $$C1 + C12 + C13 \quad (2)$$

Comparing equation 2 to equation 1, it is appreciated that the capacitive loading on bitline BIT3 according to equation 1 is less than the capacitive loading on bitline BIT3 according to equation 2. Therefore, the deactivation of the sample and hold switches coupled to idle bitlines reduces capacitive loading on active bitlines during full size or full resolution readouts of the pixel array, which improves settling times in accordance with the teachings of the present invention.

Figure 8B:
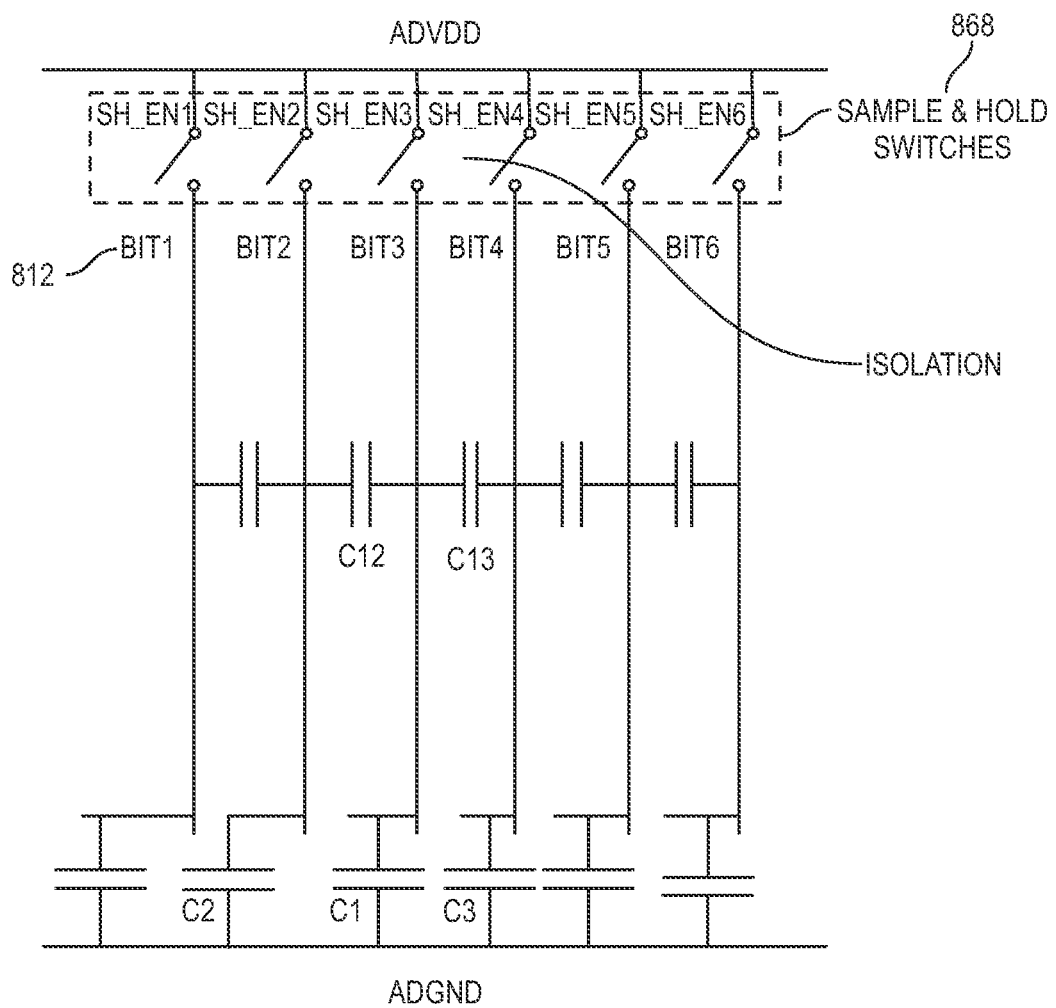
FIG. 8B illustrates an example of isolation provided by deactivated sample and hold switches coupled to bitlines of a pixel array in accordance with the teachings of the present invention.

In addition, it is further appreciated that without the isolation provided by the deactivated sample and hold switches in the idle bitlines (e.g., BIT2, BIT4), the noise in the power line ADVDD is also coupled to the active bitline (e.g., BIT3) through idle bitlines and coupling capacitances between bitlines, which degrades the power supply rejection ratio. To illustrate FIG. 8B shows an example of the isolation provided by deactivated sample and hold switches coupled to bitlines of a pixel array in accordance with the teachings of the present invention. It is appreciated that the bitlines 812 depicted in FIG. 8B may be examples of the bitlines 812 depicted in FIG. 8A but with deactivated sample and hold switches 868, and that similarly named and numbered elements described above are coupled and function similarly below. As shown in the depicted example, isolation from the power line ADVDD through neighboring bitlines is provided by the deactivated sample and hold switches in accordance with the teachings of the present invention. As such, the power supply rejection ratio is improved by deactivating the sample and hold switches in idle bitlines in accordance with the teachings of the present invention.

Figure 9A:
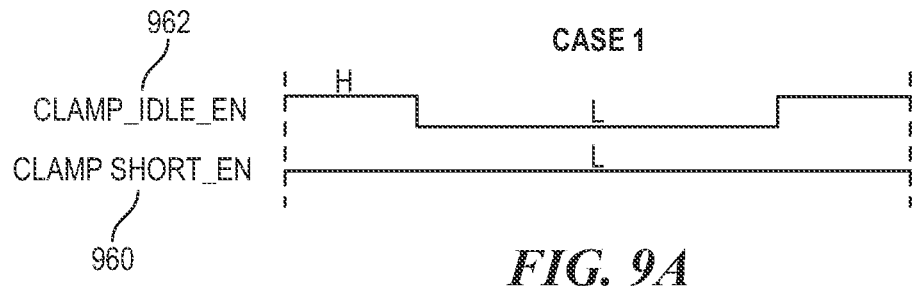
FIG. 9A illustrates one example of timing diagram of signals in an example clamp circuit coupled to a bitline during a time surrounding a readout of a pixel circuit in an example pixel array in accordance with the teachings of the present invention.

FIG. 9A illustrates one example of timing diagram of signals in an example clamp circuit coupled to a bitline during a time surrounding a readout of a pixel circuit in an example pixel array in accordance with the teachings of the present invention. It is appreciated that the signals depicted in FIG. 9A may be examples of the signals depicted in FIG. 6, and that similarly named and numbered elements described above are coupled and function similarly below.

The example depicted in FIG. 9A illustrates a first case in which the clamp idle enable signal 962 and the clamp short enable signal 960 are configured to control the clamp short transistor 648 and the clamp short transistor 646 depicted in FIG. 6. It is noted that the clamp short enable signal 660 depicted in FIG. 6 is an inverted control signal (e.g., clamp_short_en_b 660) coupled to a control the PMOS transistor of clamp short transistor 646. As such, it is appreciated that the polarity of the clamp short enable signal 960 may be inverted as appropriate to control clamp short transistor 646 with the inverted clamp_short_en_b 660 signal of FIG. 6.

In the example depicted in FIG. 9A, the clamp short enable signal 960 is at a low level, which translates to a high inverted clamp_short_en_b signal 660 and turns off the clamp short transistor 646 depicted in FIG. 6 throughout the first case. Continuing with the depicted example, the clamp idle enable signal 962 is initially at a high value, which turns on the clamp idle transistor 648. As such, the bitline 612 is clamped to the power line ADVDD with a diode drop across the first diode drop device 650. In one example, the bitline 612 is clamped to value close to the black level of the bitline at this time to speed up the settling time of the bitline 612.

Next, during a normal readout, the clamp idle enable signal 962 transitions to a low value, which turns off or disables the clamp idle transistor 648 during the normal readout through bitline 612.

Next, after the normal readout through bitline 612, the clamp idle enable signal 962 transitions back to the high value, which turns on or enables the clamp idle transistor 648 back to the clamping value of the power line ADVDD with a diode drop across the first diode drop device 650 near the black level of the bitline. In one example, this value would be sampled and held when the active row is switched to an idle row in response to the corresponding sample and hold enable signal. In various examples, this sampled value is held by the parasitic capacitance coupled to the bitline 612.

Figure 9B:
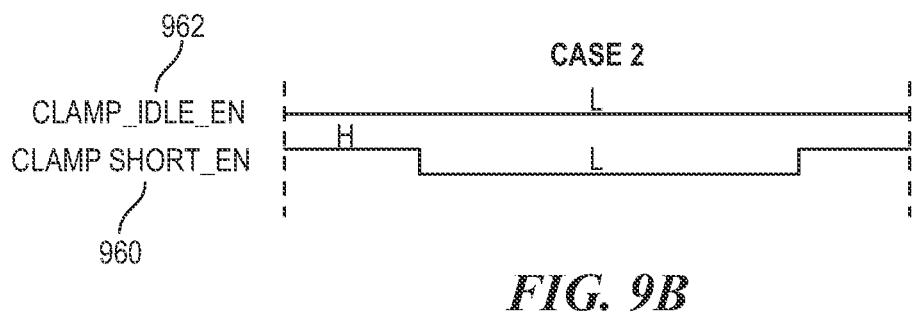
FIG. 9B illustrates another example of timing diagram of signals in an example clamp circuit coupled to a bitline during a time surrounding a readout of a pixel circuit in an example pixel array in accordance with the teachings of the present invention.

FIG. 9B illustrates another example of timing diagram of signals in an example clamp circuit coupled to a bitline during a time surrounding a readout of a pixel circuit in an example pixel array in accordance with the teachings of the present invention. It is appreciated that the signals depicted in FIG. 9B may be examples of the signals depicted in FIG. 6, and that similarly named and numbered elements described above are coupled and function similarly below.

The example depicted in FIG. 9B illustrates a second case in which the clamp idle enable signal 962 and the clamp short enable signal 960 are configured to control the clamp idle transistor 648 and the clamp short 646 depicted in FIG. 6. It is noted that the clamp short enable signal 660 depicted in FIG. 6 is an inverted control signal (e.g., clamp_short- _en_b 660) coupled to a control the PMOS transistor of clamp short transistor 646. As such, it is appreciated that the polarity of the clamp short enable signal 960 may be inverted as appropriate to control the clamp short transistor 646 with the inverted clamp_short_en_b 660 signal of FIG. 6.

In the example depicted in FIG. 9B, the clamp idle enable signal 962 is at a low level, which turns off the clamp idle transistor 648 depicted in FIG. 6 throughout the second case. Continuing with the depicted example, the clamp short enable signal 960 is initially at a high value, which turns on the clamp short transistor 646. As such, the bitline 612 is clamped to the power line ADVDD. In one example, the bitline 612 is clamped to value close to the black level of the bitline at this time to speed up the settling time of the bitline 612.

Next, during a normal readout, the clamp short enable signal 960 transitions to a low value, which turns off or disables the clamp short transistor 646 during the normal readout through bitline 612.

Next, after the normal readout through bitline 612, the clamp short enable signal 960 transitions back to the high value, which turns on or enables the clamp short transistor 646 back to the clamping value of the power line ADVDD near the black level of the bitline. In one example, this value would be sampled and held when the active row is switched to an idle row in response to the corresponding sample and hold enable signal. In various examples, this sampled value is held by the parasitic capacitance coupled to the bitline 612.

Figure 9C:
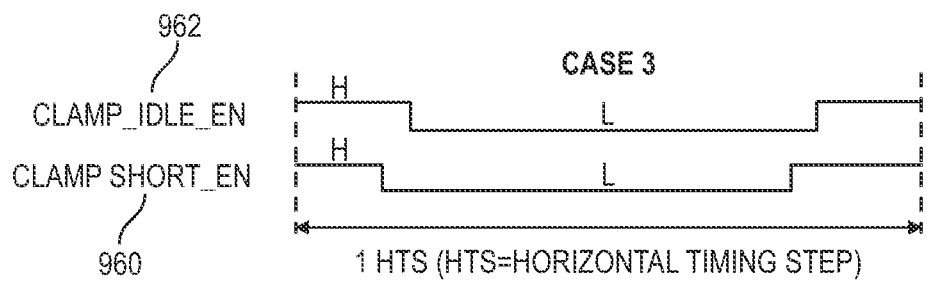
FIG. 9C illustrates yet another example of timing diagram of signals in an example clamp circuit coupled to a bitline during a time surrounding a readout of a pixel circuit in an example pixel array in accordance with the teachings of the present invention.

FIG. 9C illustrates yet another example of timing diagram of signals in an example clamp circuit coupled to a bitline during a time surrounding a readout of a pixel circuit in an example pixel array in accordance with the teachings of the present invention. It is appreciated that the signals depicted in FIG. 9C may be examples of the signals depicted in FIG. 6, and that similarly named and numbered elements described above are coupled and function similarly below.

The example depicted in FIG. 9C illustrates a third case in which the clamp idle enable signal 962 and the clamp short enable signal 960 are configured to control the clamp idle transistor 648 and the clamp short transistor 646 depicted in FIG. 6. It is noted that the clamp short enable signal 660 depicted in FIG. 6 is an inverted control signal (e.g., clamp_short_en_b 660) coupled to a control the PMOS transistor of clamp short transistor 646. As such, it is appreciated that the polarity of the clamp short enable signal 960 may be inverted as appropriate to control short transistor 646 with the inverted clamp_short_en_b 660 signal of FIG. 6.

It is noted that the third case depicted in FIG. 9C is a hybrid case in which the active row bitline is clamped by the power line ADVDD with the diode drop (e.g., through first diode drop device 650 and clamp idle transistor 648), while the idle row bitline is clamped to the power line ADVDD (e.g., through clamp short transistor 646).

As shown in the example depicted in FIG. 9C, the clamp idle enable signal 962 and the clamp short enable signal 960 are initially at a high value, which turns on the clamp idle transistor 648 and the clamp short transistor 646. As such, the idle bitline is clamped to the power line ADVDD and the active bitline is clamped to the power line ADVDD with the diode drop.

Next, during a normal readout, the clamp short enable signal 960 and then the clamp idle enable signal 962 transition to a low value, which turns off or disables the clamp short transistor 646 and then clamp idle transistor 648 for the normal readout through bitline 612.

Next, after the normal readout through bitline 612, the clamp short enable signal 960 and then the clamp idle enable signal 962 transition back to the high value, which turn on or enable the clamp short transistor 646 and then the clamp idle transistor 648 back to the clamping value of the power line ADVDD for the idle row and the clamping value of the power line ADVDD with the diode drop for the active bitline. In one example, the clamped value for the idle bitline would be sampled and held when the active row is switched to the idle row in response to the corresponding sample and hold enable signal. In various examples, this sampled value is held by the parasitic capacitance coupled to the bitline 612. It is appreciated that the period of time to initialize the bitline 612 to the clamp value, perform the normal readout through bitline 612, and then clamp the bitline 612 to the clamp value again after the normal readout is 1 horizontal timing step (HTP), as labeled in FIG. 9C.

Figure 10A:
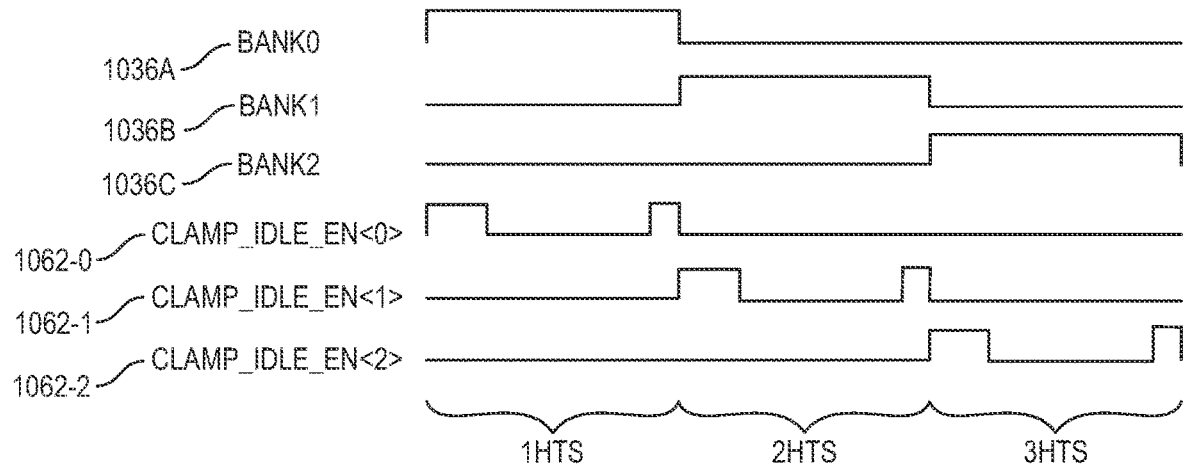
FIG. 10A illustrates one example of timing diagram of signals in an example clamp circuit coupled to a bitline during a time surrounding a readout of a banks of pixel circuits in an example pixel array in accordance with the teachings of the present invention.

FIG. 10A illustrates one example of timing diagram of signals in an example clamp circuit coupled to a bitline during a time surrounding a readout of a banks of pixel circuits in an example pixel array in accordance with the teachings of the present invention. It is appreciated that the signals depicted in FIG. 10A may be examples of signals depicted in FIG. 6, and that similarly named and numbered elements described above are coupled and function similarly below.

The example depicted in FIG. 10A illustrates a bank0 1036A signal, a bank1 1036B, and a bank2 1036C signal. In the example, bank0 is readout when the bank0 1036A signal is high. As shown, during the first horizontal timing step (e.g., 1HTS), the bank1 1036B and bank2 1036C signals are low while the bank0 1036A signal is high. As such, the bank 0 bitlines (e.g., BL0) are active while the bank 1 and bank 2 bitlines (e.g., BL1, BL2) are idle or not used. During the first horizontal timing step (e.g., 1HTS), the 1×3 pixel circuits included in bank 0 are readout, which is indicated with clamp idle enable signal 1062-0 for bank 0 (e.g., clamp_idle_en<0> 662) being activated, then deactivated, and then reactivated, which enables, disables, and then enables the clamp idle transistor 648 during the first horizontal timing step as also shown in the case 1 example described in detail in FIG. 9A.

Next, during the second horizontal timing step (e.g., 2HTS), bank 1 is readout when the bank1 1036B is high. As shown, during the second horizontal timing step (e.g., 2HTS), the bank0 1036A and bank2 1036C signals are low while the bank1 1036B signal is high. As such, the bank 1 bitlines (e.g., BL1) are active while the bank 0 and bank 2 bitlines (e.g., BL0, BL2) are idle or not used. During the second horizontal timing step (e.g., 2HTS), the 1×3 pixel circuits included in bank 1 are readout, which is indicated with clamp idle enable signal 1062-1 for bank 1 (e.g., clamp_idle_en<1> 662) being activated, then deactivated, and then reactivated, which enables, disables, and then enables the clamp idle transistor 648 during the second horizontal timing step as also shown in the case 1 example described in detail in FIG. 9A.

Next, during the third horizontal timing step (e.g., 3HTS), bank 2 is readout when the bank2 1036C is high. As shown, during the third horizontal timing step (e.g., 3HTS), the bank0 1036A and bank1 1036B signals are low while the bank2 1036C signal is high. As such, the bank 2 bitlines (e.g., BL2) are active while the bank 0 and bank 1 bitlines (e.g., BL0, BL1) are idle or not used. During the third horizontal timing step (e.g., 3HTS), the 1×3 pixel circuits included in bank 2 are readout, which is indicated with clamp idle enable signal 1062-2 for bank 2 (e.g., clamp_idle_en<2> 662) being activated, then deactivated, and then reactivated, which enables, disables, and then enables the clamp idle transistor 648 during the third horizontal timing step as also shown in the case 1 example described in detail in FIG. 9A.

Figure 10B:
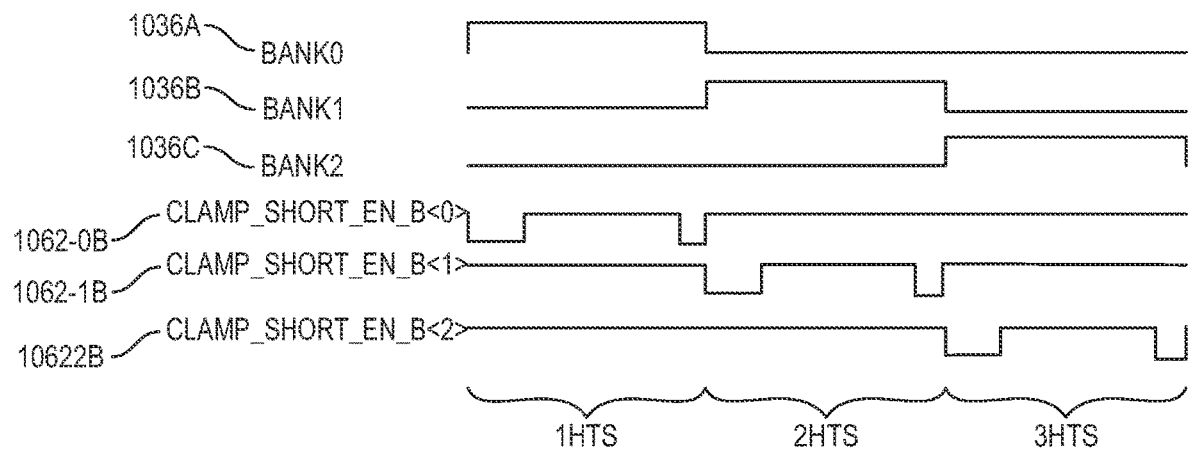
FIG. 10B illustrates another example of timing diagram of signals in an example clamp circuit coupled to a bitline during a time surrounding a readout of a banks of pixel circuits in an example pixel array in accordance with the teachings of the present invention.

FIG. 10B illustrates another example of timing diagram of signals in an example clamp circuit coupled to a bitline during a time surrounding a readout of a banks of pixel circuits in an example pixel array in accordance with the teachings of the present invention. It is appreciated that the signals depicted in FIG. 10B may be examples of signals depicted in FIG. 6, and that similarly named and numbered elements described above are coupled and function similarly below. It also appreciated that the example depicted in FIG. 10B shares many similarities with the example depicted in FIG. 10A. As difference between the example depicted in FIG. 10B and the example depicted in FIG. 10A is that in the example depicted in FIG. 10B, the clamp short transistor 646 is switched instead of the clamp idle transistor 648 during a readout.

To illustrate, the example depicted in FIG. 10B shows a bank0 1036A signal, a bank1 1036B, and a bank2 1036C signal. In the example, bank 0 is readout when the bank0 1036A signal is high. As shown, during the first horizontal timing step (e.g., 1HTS), the bank1 1036B and bank2 1036C signals are low while the bank0 1036A signal is high. As such, the bank 0 bitlines (e.g., BL0) are active while the bank 1 and bank 2 bitlines (e.g., BL1, BL2) are idle or not used. During the first horizontal timing step (e.g., 1HTS), the 1×3 pixel circuits included in bank 0 are readout, which is indicated with the (active low) clamp short enable signal 1060-0B for bank 0 (e.g., clamp_short_en_b<0> 660) being activated, then deactivated, and then reactivated, which enables, disables, and then enables the clamp short transistor 646 during the first horizontal timing step as also shown in the case 2 example described in detail in FIG. 9B.

Next, during the second horizontal timing step (e.g., 2HTS), bank 1 is readout when the bank1 1036B is high. As shown, during the second horizontal timing step (e.g., 2HTS), the bank0 1036A and bank2 1036C signals are low while the bank1 1036B signal is high. As such, the bank 1 bitlines (e.g., BL1) are active while the bank 0 and bank 2 bitlines (e.g., BL0, BL2) are idle or not used. During the second horizontal timing step (e.g., 2HTS), the 1×3 pixel circuits included in bank 1 are readout, which is indicated with the (active low) clamp short enable signal 1060-1B for bank 1 (e.g., clamp_short_en_b<1> 660) being activated, then deactivated, and then reactivated, which enables, disables, and then enables the clamp short transistor 646 during the second horizontal timing step as also shown in the case 2 example described in detail in FIG. 9B.

Next, during the third horizontal timing step (e.g., 3HTS), bank 2 is readout when the bank2 1036C is high. As shown, during the third horizontal timing step (e.g., 3HTS), the bank0 1036A and bank1 1036B signals are low while the bank2 1036C signal is high. As such, the bank 2 bitlines (e.g., BL2) are active while the bank 0 and bank 1 bitlines (e.g., BL0, BL1) are idle or not used. During the third horizontal timing step (e.g., 3HTS), the 1×3 pixel circuits included in bank 2 are readout, which is indicated with the (active low) clamp short enable signal 1060-2B for bank 2 (e.g., clamp_short_en_b<2> 660) being activated, then deactivated, and then reactivated, which enables, disables, and then enables the clamp short transistor 646 during the third horizontal timing step as also shown in the case 2 example described in detail in FIG. 9B.

Figure 11:
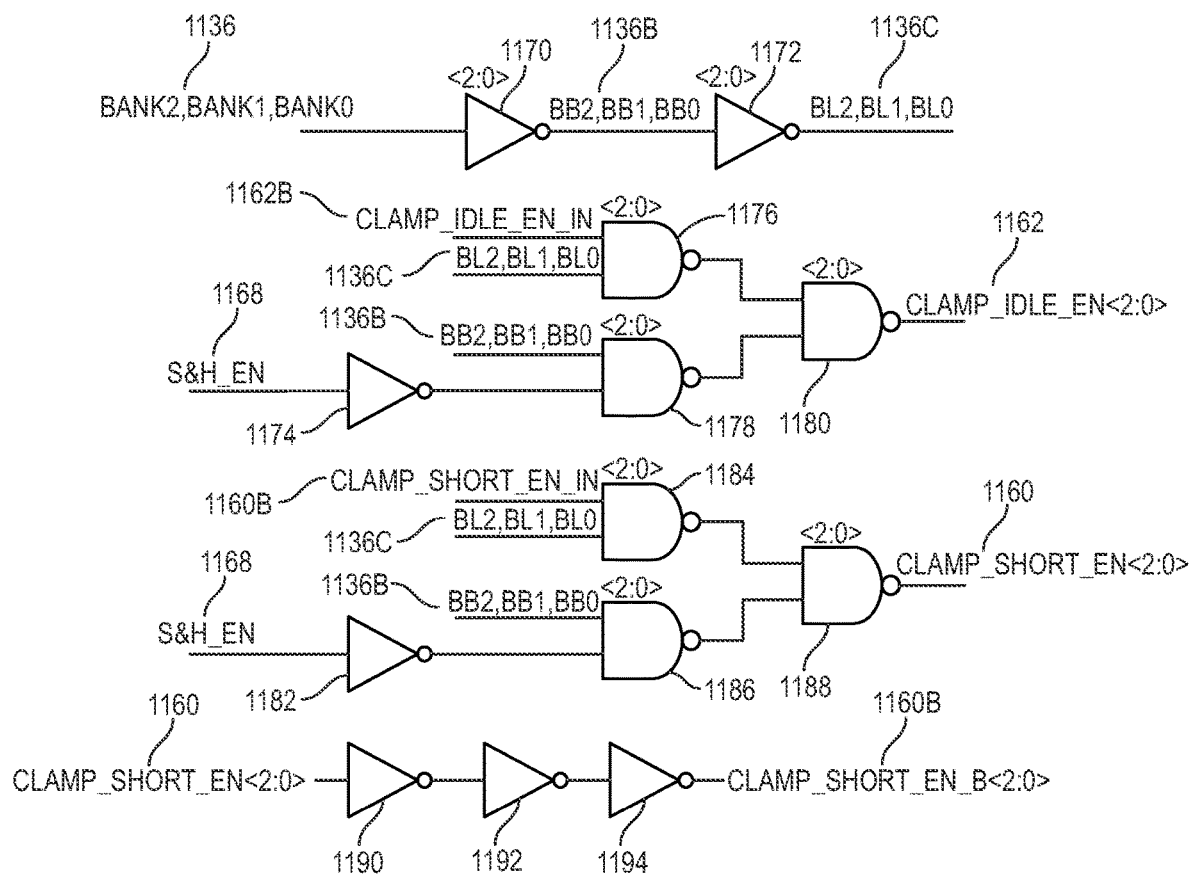
FIG. 11 illustrates an example logic diagram for generating signals for an example clamp circuit in accordance with the teachings of the present invention.

FIG. 11 illustrates an example logic diagram for generating signals for an example clamp circuit in accordance with the teachings of the present invention. It is appreciated that the signals depicted in FIG. 11 may be examples of signals depicted in FIGS. 6-10B, and that similarly named and numbered elements described above are coupled and function similarly below.

As shown in the depicted example, bank2, bank1, bank0 signals 1136 are received by inverters<2:0> 1170, which output inverted signals bb2, bb1, bb0 1136B, which are received by inverters<2:0> 1172, which output bank signals b12, b11, b10 1136C. Inverter 1174 receives sample and hold enable signal S&H_en 1168. NAND gates<2:0> 1178 are coupled to receive the inverted signals bb2, bb1, bb0 1136B and the output of inverter 1174. NAND gates<2:0> 1176 are coupled to receive clamp idle enable input signals clamp_idle_en_in 1162B and the bank signals b12, b11, b10 1136C. NAND gates<2:0> 1180 are coupled to receive the outputs of the NAND gates<2:0> 1176 and the outputs of NAND gates<2:0> 1178 to generate the clamp idle enable signals clamp_idle_en<2:0> 1162, which are coupled to be received by the clamp idle transistors 648 of the clamp circuits 644, as discussed in FIG. 6.

Referring back to the example diagram shown in FIG. 11, an inverter 1182 is also coupled to receive sample and hold enable signal S&H_en 1168. NAND gates<2:0> 1186 are also coupled to receive the inverted signals bb2, bb1, bb0 1136B and the output of inverter 1182. NAND gates<2:0> 1184 are coupled to receive clamp short enable input signals clamp_short_en_in 1160B and the bank signals b12, b11, b10 1136C. NAND gates<2:0> 1188 are coupled to receive the outputs of the NAND gates<2:0> 1184 and the outputs of NAND gates<2:0> 1186 to generate the clamp short enable signals clamp_short_en<2:0> 1160. In the example, 3 series coupled inverters 1190, 1192, and 1194 are coupled to receive the clamp short enable signals clamp_short_en<2:0> 1160 to generated inverted clamp short enable signals clamp_short_en_b<2:0> 1160B, which are coupled to be received by the clamp short transistors 648 of the clamp circuits 644, as discussed in FIG. 6.

The above description of illustrated examples of the invention, including what is described in the Abstract, is not intended to be exhaustive or to limit the invention to the precise forms disclosed. While specific examples of the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific examples disclosed in the specification. Rather, the scope of the invention is to be determined entirely by the following claims, which are to be construed in accordance with established doctrines of claim interpretation.

What is claimed is:

1. An imaging device, comprising:
   a pixel array including a plurality of pixel circuits arranged in rows and columns;
   a plurality of bitlines coupled to the plurality of pixel circuits; and
   a plurality of clamp circuits coupled to the plurality of bitlines, wherein each one of the plurality of clamp circuits comprises:

a clamp short transistor coupled to a power line and a respective one of the plurality of bitlines of the pixel array, wherein the clamp short transistor is configured to be switched in response to a clamp short enable signal;

a first diode drop device coupled to the power line; and a clamp idle transistor coupled to the first diode drop device such that the first diode drop device and the clamp idle transistor are coupled between the power line and the respective one of the plurality of bitlines, wherein the clamp idle transistor is configured to be switched in response to a clamp idle enable signal.

2. The imaging device of claim 1, wherein each one of the plurality of clamp circuits further comprises:

a second diode drop device coupled to the power line;

a tunable voltage level transistor coupled to the second diode drop device, wherein the second transistor is configured to be biased in response to a tunable voltage level signal; and a clamp signal transistor coupled to the tunable voltage level transistor such that the second diode drop device, the tunable voltage level transistor, and the clamp signal transistor are coupled between the power line and the respective one of the plurality of bitlines, wherein the clamp signal transistor is configured to be switched in response to a clamp signal enable signal.

3. The imaging device of claim 2, further comprising a plurality of sample and hold switches coupled to the plurality of bitlines, wherein the respective one of the plurality bitlines is further coupled to a respective one of the plurality of sample and hold switches, wherein the respective one of the plurality of sample and hold switches is configured to be switched in response to a sample and hold enable signal.

4. The imaging device of claim 3, wherein a parasitic capacitance coupled to the respective one of the plurality bitlines is configured to hold a sampled voltage on the respective one of the plurality bitlines in response to the respective one of the plurality of sample and hold switches.

5. The imaging device of claim 4, wherein the plurality of pixel circuits comprises a plurality of 1×3 pixel circuits arranged in the rows and columns of the pixel array, wherein each 1×3 pixel circuit includes 3 photodiodes included in a respective column of 1×3 pixel circuits in the pixel array, wherein the 3 photodiodes of each 1×3 pixel circuit included in the respective column of 1×3 pixel circuits in the pixel array are included in a respective 3 rows of the pixel array.

6. The imaging device of claim 5, wherein the plurality of bitlines is divided into a groupings of 3 bitlines per column of the 1×3 pixel circuits in the pixel array, wherein each column of the 1×3 pixel circuits in the pixel array includes a plurality of first banks of the 1×3 pixel circuits coupled to a first bitline of a respective grouping of the 3 bitlines, a plurality of second banks of the 1×3 pixel circuits coupled to a second bitline of the respective grouping of the 3 bitlines, and a plurality of third banks of the 1×3 pixel circuits coupled to a third bitline of the respective grouping of the 3 bitlines.

7. The imaging device of claim 6, wherein 1 bitline per the groupings of 3 bitlines per column of the 1×3 pixel circuits in the pixel array is configured to be active at a time while remaining bitlines of the groupings of 3 bitlines per column of the 1×3 pixel circuits in the pixel array are inactive during a full resolution readout of the pixel array.

8. The imaging device of claim 7, wherein the respective one of the plurality of sample and hold switches is configured to be turned on when the respective one of the plurality of bitlines is active, wherein the respective one of the plurality of sample and hold switches is configured to be turned off when the respective one of the plurality of bitlines is idle.

9. The imaging device of claim 8, wherein the clamp idle transistor is configured to be turned on to clamp the respective one of the plurality of bitlines close to a black level of the respective one of the plurality of bitlines, wherein the clamp idle transistor is then configured to be turned off during a normal readout of the respective one of the plurality of bitlines, wherein the clamp idle transistor is then configured to be turned on after the normal readout of the respective one of the plurality of bitlines.

10. The imaging device of claim 9, wherein the respective one of the plurality of sample and hold switches coupled to the respective one of the plurality of bitlines is turned on while the respective one of the plurality of bitlines is active, wherein the respective one of the plurality of sample and hold switches coupled to the respective one of the plurality of bitlines is turned off when the respective one of the plurality of bitlines become idle.

11. The imaging device of claim 8, wherein the clamp short transistor is configured to be turned on to clamp the respective one of the plurality of bitlines to the power line coupled to the respective one of the plurality of bitlines, wherein the clamp short transistor is then configured to be turned off during a normal readout of the respective one of the plurality of bitlines, wherein the clamp short transistor is then configured to be turned on after the normal readout of the respective one of the plurality of bitlines.

12. The imaging device of claim 11, wherein the respective one of the plurality of sample and hold switches coupled to the respective one of the plurality of bitlines is turned on while the respective one of the plurality of bitlines is active, wherein the respective one of the plurality of sample and hold switches coupled to the respective one of the plurality of bitlines is turned off when the respective one of the plurality of bitlines become idle.

13. An imaging system, comprising:

a pixel array including a plurality of pixel circuits arranged in rows and columns;

a plurality of bitlines coupled to the plurality of pixel circuits;

a plurality of clamp circuits coupled to the plurality of bitlines, wherein each one of the plurality of clamp circuits comprises:

a clamp short transistor coupled to a power line and a respective one of the plurality of bitlines of the pixel array, wherein the clamp short transistor is configured to be switched in response to a clamp short enable signal;

a first diode drop device coupled to the power line; and a clamp idle transistor coupled to the diode drop device such that the first diode drop device and the clamp idle transistor are coupled between the power line and the respective one of the plurality of bitlines, wherein the clamp idle transistor is configured to be switched in response to a clamp idle enable signal;

a plurality of sample and hold switches coupled to the plurality of bitlines, wherein the respective one of the plurality bitlines is further coupled to a respective one of the plurality of sample and hold switches; and a readout circuit coupled to the pixel array to readout signals from the pixel array through the plurality of bitlines, the readout circuit including a plurality of current sources coupled to the plurality of bitline.

14. The imaging system of claim 13, wherein a parasitic capacitance coupled to the respective one of the plurality of bitlines is configured to hold a sampled voltage on the respective one of the plurality of bitlines.

15. The imaging system of claim 14, wherein the respective one of the plurality of sample and hold switches is configured to be turned on when the respective one of the plurality of bitlines is active, wherein the respective one of the plurality of sample and hold switches is configured to be turned off when the respective one of the plurality of bitlines is idle.

16. The imaging system of claim 15,
wherein the clamp idle transistor is configured to be turned on to clamp the respective one of the plurality of bitlines close to a black level of the respective one of the plurality of bitlines prior to a normal readout of the respective one of the plurality of bitlines,
wherein the clamp idle transistor is then configured to be turned off during the normal readout of the respective one of the plurality of bitlines,
wherein the clamp idle transistor is then configured to be turned on after the normal readout of the respective one of the plurality of bitlines.

17. The imaging system of claim 15,
wherein the clamp short transistor is configured to be turned on to clamp the respective one of the plurality of bitlines to the power line coupled to the respective one of the plurality of bitlines prior to a normal readout of the respective one of the plurality of bitlines,
wherein the clamp short transistor is then configured to be turned off during the normal readout of the respective one of the plurality of bitlines,
wherein the clamp short transistor is then configured to be turned on after the normal readout of the respective one of the plurality of bitlines.

18. The imaging system of claim 13, wherein each one of the plurality of clamp circuits further comprises:
a second diode drop device coupled to the power line;
a tunable voltage level transistor coupled to the second diode drop device, wherein the second transistor is configured to be biased in response to a tunable voltage level signal; and
a clamp signal transistor coupled to the tunable voltage level transistor such that the second diode drop device, the tunable voltage level transistor, and the clamp signal transistor are coupled between the power line and the respective one of the plurality of bitlines, wherein the clamp signal transistor is configured to be switched in response to a clamp signal enable signal.

19. The imaging system of claim 13, wherein the plurality of pixel circuits comprises a plurality of 1×3 pixel circuits arranged in the rows and columns of the pixel array, wherein each 1×3 pixel circuit includes 3 photodiodes included in a respective column of 1×3 pixel circuits in the pixel array, wherein the 3 photodiodes of each 1×3 pixel circuit included in the respective column of 1×3 pixel circuits in the pixel array are included in a respective 3 rows of the pixel array.

20. The imaging system of claim 19, wherein the plurality of bitlines is divided into a groupings of 3 bitlines per column of the 1×3 pixel circuits in the pixel array, wherein each column of the 1×3 pixel circuits in the pixel array includes a plurality of first banks of the 1×3 pixel circuits coupled to a first bitline of a respective grouping of the 3 bitlines, a plurality of second banks of the 1×3 pixel circuits coupled to a second bitline of the respective grouping of the 3 bitlines, and a plurality of third banks of the 1×3 pixel circuits coupled to a third bitline of the respective grouping of the 3 bitlines.

21. The imaging system of claim 20, wherein 1 bitline per the groupings of 3 bitlines per column of the 1×3 pixel circuits in the pixel array is configured to be active at a time while remaining bitlines of the groupings of 3 bitlines per column of the 1×3 pixel circuits in the pixel array are inactive during a full resolution readout of the pixel array.

* * * * *